US012795302B2

(12) United States Patent
Kim

(10) Patent No.: US 12,795,302 B2
(45) Date of Patent: Nov. 10, 2026

(54) APPARATUS FOR GENERATING VIBRATION

(71) Applicant: LG Display Co., Ltd., Seoul (KR)

(72) Inventor: Yongjoon Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 177 days.

(21) Appl. No.: 18/790,324

(22) Filed: Jul. 31, 2024

(65) Prior Publication Data

US 2025/0048036 A1 Feb. 6, 2025

(30) Foreign Application Priority Data

Aug. 3, 2023 (KR) ........................ 10-2023-0101771

(51) Int. Cl.
*H04R 17/00* (2006.01)

(52) U.S. Cl.
CPC ......... *H04R 17/00* (2013.01); *H04R 2499/15* (2013.01)

(58) Field of Classification Search
CPC .... H04R 17/00; H04R 2499/15; H04R 7/045; H04R 2440/05; H04R 9/02; H04R 9/06; H04R 2400/11; H04R 7/16; G09F 27/00; G09F 9/30; G09F 15/00; B60K 35/22; B60K 35/26
See application file for complete search history.

(56) References Cited

U.S. PATENT DOCUMENTS

2018/0317011 A1* 11/2018 Choi ...................... H04R 9/063
2022/0181403 A1* 6/2022 Ham ................. G02F 1/133305
2022/0182744 A1* 6/2022 Han ....................... H04R 17/00

* cited by examiner

*Primary Examiner* — Mark Fischer
(74) *Attorney, Agent, or Firm* — Morgan, Lewis & Bockius LLP

(57) ABSTRACT

An apparatus includes a vibration member, a vibration apparatus configured to vibrate the vibration member, the vibration apparatus including a long side and a short side, and a pad member connected to a rear surface of the vibration apparatus, wherein the pad member includes a line shape which is parallel to a long-side length direction of the vibration apparatus, or is inclined from the long-side length direction of the vibration apparatus.

26 Claims, 10 Drawing Sheets

APPARATUS FOR GENERATING VIBRATION

CROSS-REFERENCE TO RELATED APPLICATION

This application claims priority to Korean Patent Application No. 10-2023-0101771, filed in the Republic of Korea on Aug. 3, 2023, the entire contents of which is hereby expressly incorporated by reference into the present application.

BACKGROUND

Technical Field

The present disclosure relates to an apparatus.

Description of the Related Art

Apparatuses include a separate speaker or a sound apparatus for providing a sound. When a speaker is in a display apparatus, the speaker occupies a space, due to this, the design and spatial disposition of the display apparatus are limited.

A speaker applied to the apparatus may be, for example, an actuator that includes a magnet and a coil. However, when the actuator is applied to the apparatus, a thickness thereof is thickened. Therefore, piezoelectric devices for realizing a thin thickness are attracting much attention.

SUMMARY

A sound, which is generated in a speaker embedded in an apparatus or a sound apparatus, is output in a rearward direction or a lateral direction of the apparatus instead of a forward direction of the apparatus and thus does not travel toward a viewer or a user who is watching an image at a front region with respect to the apparatus or the display apparatus, and due to this, there is a problem where an immersion experience of the viewer watching the image is hindered.

Accordingly, the inventor of the present disclosure has recognized problems described above and have performed extensive research and experiments for implementing an apparatus for enhancing the quality of a sound and a sound pressure level characteristic. Through the extensive research and experiments, the inventor of the present disclosure has invented an apparatus for enhancing the quality of a sound and a sound characteristic and/or a sound pressure level characteristic.

Accordingly, embodiments of the present disclosure are directed to an apparatus that substantially obviates one or more of the problems due to limitations and disadvantages of the related art.

An aspect of the present disclosure is to provide an apparatus which may vibrate a vibration member to generate a sound or a vibration and have enhanced a sound characteristic and/or a sound pressure level characteristic.

Additional features, advantages, and aspects of the present disclosure are set forth in part in the present disclosure and will also be apparent from the present disclosure or may be learned by practice of the inventive concepts provided herein. Other features, advantages, and aspects of the present disclosure may be realized and attained by the descriptions provided in the present disclosure, or derivable therefrom, and claims hereof as well as the appended drawings.

To achieve these and other advantages and aspects of the present disclosure, as embodied and broadly described herein, in one or more aspects, an apparatus may comprise a vibration member, a vibration apparatus configured to vibrate the vibration member, the vibration apparatus including a long side and a short side, and a pad member connected to a rear surface of the vibration apparatus. The pad member may comprise a line shape which is parallel to a long-side length direction of the vibration apparatus, or is inclined from the long-side length direction of the vibration apparatus.

An apparatus according to an embodiment of the present disclosure may vibrate a vibration member to generate a sound and may output a sound having an enhanced sound characteristic and/or sound pressure level characteristic in a forward direction of the vibration member.

According to an embodiment of the present disclosure, a pad member may be configured at a rear surface of a vibration apparatus, thereby providing an apparatus where a sound characteristic and/or a sound pressure level characteristic of a middle-high-pitched sound band may be enhanced.

According to an embodiment of the present disclosure, a pad member may be configured at a rear surface of a vibration apparatus, thereby providing an apparatus where a peak and/or dip in a high-pitched sound band are/is improved.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with aspects of the disclosure.

It is to be understood that both the foregoing description and the following description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this disclosure, illustrate aspects and embodiments of the disclosure and together with the description serve to explain principles of the disclosure.

Figure 1:
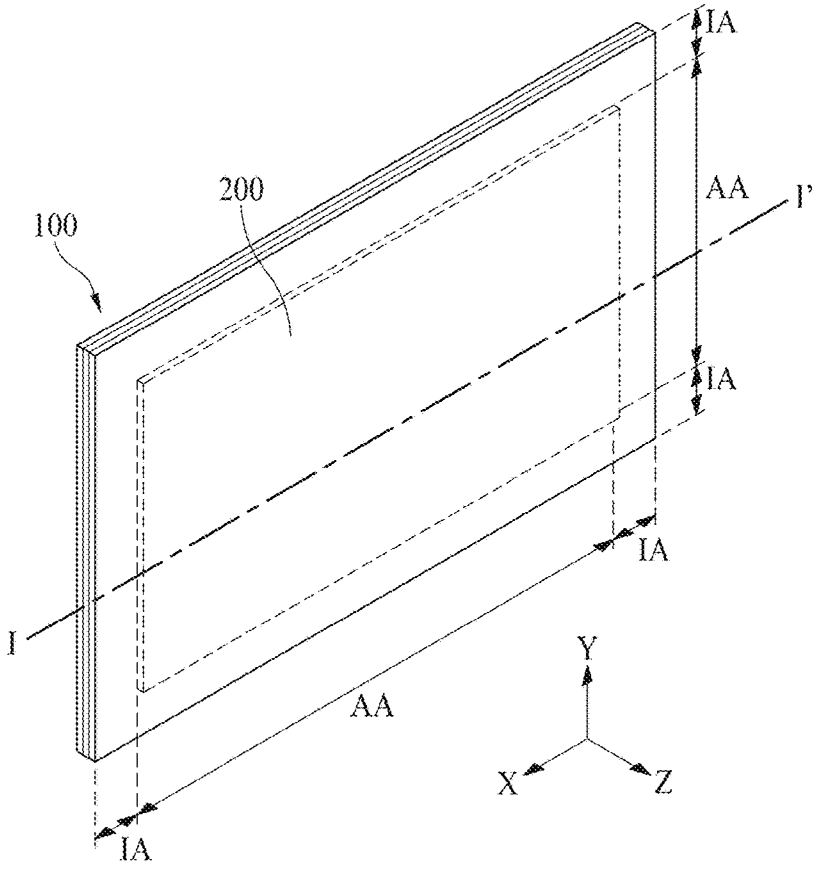
FIG. 1 illustrates an apparatus according to an embodiment of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction of thereof may be exaggerated for clarity, illustration, and/or convenience.

DETAILED DESCRIPTION

Reference is now made in detail to aspects of the present disclosure, examples of which can be illustrated in the accompanying drawings. In the following description, when a detailed description of well-known methods, functions, structures, or configurations can unnecessarily obscure aspects of the present disclosure, a detailed description of such known functions or configurations may be omitted for brevity. Further, repetitive descriptions may be omitted for brevity. The progression of processing steps and/or operations described is a non-limiting example.

The sequence of steps and/or operations is not limited to that set forth herein and can be changed to occur in an order that is different from an order described herein, with the exception of steps and/or operations necessarily occurring in a particular order. In one or more examples, two operations in succession can be performed substantially concurrently, or the two operations can be performed in a reverse order or in a different order depending on a function or operation involved.

Unless stated otherwise, like reference numerals can refer to like elements throughout even when they are shown in different drawings. Unless stated otherwise, the same reference numerals may be used to refer to the same or substantially the same elements throughout the specification and the drawings. In one or more aspects, identical elements (or elements with identical names) in different drawings can have the same or substantially the same functions and properties unless stated otherwise. Names of the respective elements used in the following explanations are selected only for convenience and can be thus different from those used in actual products.

Advantages and features of the present disclosure, and implementation methods thereof, are clarified through the aspects described with reference to the accompanying drawings. The present disclosure may, however, be embodied in different forms and should not be construed as limited to the example aspects set forth herein. Rather, these example aspects are examples and are provided so that this disclosure can be thorough and complete to assist those skilled in the art to understand the inventive concepts without limiting the protected scope of the present disclosure.

Shapes, dimensions (e.g., sizes, lengths, widths, heights, thicknesses, locations, radii, diameters, and areas), proportions, ratios, angles, numbers, the number of elements, and the like disclosed herein, including those illustrated in the drawings, are merely examples, and thus, the present disclosure is not limited to the illustrated details. It is, however, noted that the relative dimensions of the components illustrated in the drawings are part of the present disclosure.

Where a term like "comprise," "have," "include," "contain," "constitute," "made of," "formed of," "composed of," or the like is used with respect to one or more elements (e.g., layers, films, regions, components, sections, members, parts, regions, areas, portions, steps, operations, and/or the like), one or more other elements can be added unless a term such as "only" or the like is used. The terms used in the present disclosure are merely used in order to describe particular example aspects and are not intended to limit the scope of the present disclosure. The terms of a singular form can include plural forms unless the context clearly indicates otherwise.

The word "exemplary" is used to mean serving as an example or illustration, unless otherwise specified. Embodiments are example embodiments. Aspects are example aspects. Here, in one or more implementations, "embodiments," "aspects," "examples," and the like should not be construed to be preferred or advantageous over other implementations. An aspect, an example, an example aspect, or the like can refer to one or more aspects, one or more examples, one or more example aspects, or the like, unless stated otherwise. Further, the term "can" encompasses all the meanings and coverages of the term "may."

In one or more aspects, unless explicitly stated otherwise, an element, feature, or corresponding information (e.g., a level, range, dimension, size, or the like) is construed to include an error or tolerance range even where no explicit description of such an error or tolerance range is provided. An error or tolerance range can be caused by various factors (e.g., process factors, internal or external impact, noise, or the like). In interpreting a numerical value, the value is interpreted as including an error range unless explicitly stated otherwise.

In describing a positional relationship, when the positional relationship between two parts (e.g., layers, films, regions, components, sections, or the like) is described, for example, using "on," "upon," "on top of," "over," "under," "above," "below," "beneath," "near," "close to," "adjacent to," "beside," "next to," "at or on a side of," or the like, one or more other parts can be located between the two parts unless a more limiting term, such as "immediate(ly)," "direct(ly)," or "close(ly)," is used. For example, where a structure is described as being positioned "on," "upon," "on top of," "over," "under," "above," "below," "beneath," "near," "close to," "adjacent to," "beside," "next to," "at or on a side of," or the like another structure, this description should be construed as including a case in which the structures contact each other as well as a case in which one or more additional structures are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

Spatially relative terms, such as "below," "beneath," "lower," "on," "above," "upper" and the like, can be used to describe a correlation between various elements (e.g., layers, films, regions, components, sections, or the like) as shown in the drawings. The spatially relative terms are to be understood as terms including different orientations of the elements in use or in operation in addition to the orientation depicted in the drawings. For example, if the elements shown in the drawings are turned over, elements described as "below" or "beneath" other elements would be oriented "above" other elements. Thus, the term "below," which is an example term, can include all directions of "above" and "below." Likewise, an exemplary term "above" or "on" can include both directions of "above" and "below."

In describing a temporal relationship, when the temporal order is described as, for example, "after," "subsequent," "next," "before," "preceding," "prior to," or the like, a case that is not consecutive or not sequential can be included and thus one or more other events can occur therebetween, unless a more limiting term, such as "just," "immediate (ly)," or "direct (ly)," is used.

The terms, such as "below," "lower," "above," "upper" and the like, can be used herein to describe a relationship between element(s) as illustrated in the drawings. It will be understood that the terms are spatially relative and based on the orientation depicted in the drawings.

It is understood that, although the terms "first," "second," or the like can be used herein to describe various elements (e.g., layers, films, regions, components, sections, members, parts, regions, areas, portions, steps, operations, and/or the like), these elements should not be limited by these terms, for example, to any particular order, sequence, precedence, or number of elements. These terms are used only to distinguish one element from another. For example, a first element can denote a second element, and, similarly, a second element can denote a first element, without departing from the scope of the present disclosure. Furthermore, the first element, the second element, and the like can be arbitrarily named according to the convenience of those skilled in the art without departing from the scope of the present disclosure. For clarity, the functions or structures of these elements (e.g., the first element, the second element and the like) are not limited by ordinal numbers or the names in front of the elements. Further, a first element can include one or more first elements. Similarly, a second element or the like can include one or more second elements or the like.

In describing elements of the present disclosure, the terms "first," "second," "A," "B," "(a)," "(b)," or the like can be used. These terms are intended to identify the corresponding element(s) from the other element(s), and these are not used to define the essence, basis, sequence, order, or number of the elements.

For the expression that an element (e.g., layer, film, region, component, section, or the like) is described as "connected," "coupled," "attached," "adhered," or the like to another element, the element can not only be directly connected, coupled, attached, adhered, or the like to another element, but also be indirectly connected, coupled, attached, adhered, or the like to another element with one or more intervening elements disposed or interposed between the elements, unless otherwise specified.

For the expression that an element (e.g., layer, film, region, component, section, or the like) "contacts," "overlaps," or the like with another element, the element can not only directly contact, overlap, or the like with another element, but also indirectly contact, overlap, or the like with another element with one or more intervening elements disposed or interposed between the elements, unless otherwise specified.

The phrase that an element (e.g., layer, film, region, component, section, or the like) is "provided," "disposed," "connected," "coupled," or the like in, on, with or to another element can be understood, for example, as that at least a portion of the element is provided, disposed, connected, coupled, or the like in, on, with or to at least a portion of another element, or that the entirety of the element is provided, disposed, connected, coupled, or the like in, on, with or to another element. The phrase that an element (e.g., layer, film, region, component, section, or the like) "contacts," "overlaps," or the like with another element can be understood, for example, as that at least a portion of the element contacts, overlaps, or the like with a least a portion of another element, that the entirety of the element contacts, overlaps, or the like with a least a portion of another element, or that at least a portion of the element contacts, overlaps, or the like with the entirety of another element.

The terms such as a "line" or "direction" should not be interpreted only based on a geometrical relationship in which the respective lines or directions are parallel or perpendicular to each other. Such terms can mean a wider range of lines or directions within which the components of the present disclosure can operate functionally. For example, the terms "first direction," "second direction," and the like, such as a direction parallel or perpendicular to "x-axis," "y-axis," or "z-axis," should not be interpreted only based on a geometrical relationship in which the respective directions are parallel or perpendicular to each other, and can be meant as directions having wider directivities within the range within which the components of the present disclosure can operate functionally.

The term "at least one" should be understood as including any and all combinations of one or more of the associated listed items. For example, each of the phrases "at least one of a first item, a second item, or a third item" and "at least one of a first item, a second item, and a third item", can represent (i) a combination of items provided by one or more of the first item, the second item, and the third item or (ii) only one of the first item, the second item, and the third item.

The expression of a first element, a second elements, "and/or" a third element should be understood to encompass one of the first, second, and third elements, as well as any and all combinations of the first, second and third elements. By way of example, A, B and/or C encompass only A; only B; only C; any of A, B, and C (e.g., A, B, or C); some combinations of A, B, and C (e.g., A and B; A and C; or B and C); and all of A, B, and C. Furthermore, an expression "A/B" can be understood as A and/or B. For example, an expression "A/B" can refer to only A; only B; A or B; or A and B.

In one or more aspects, the terms "between" and "among" can be used interchangeably simply for convenience unless stated otherwise. For example, an expression "between a plurality of elements" can be understood as among a plurality of elements. In another example, an expression "among a plurality of elements" can be understood as between a plurality of elements. In one or more examples, the number of elements can be two. In one or more examples, the number of elements can be more than two. Furthermore, when an element (e.g., layer, film, region, component, sections, or the like) is referred to as being "between" at least two elements, the element can be the only element between the at least two elements, or one or more intervening elements can also be present.

In one or more aspects, the phrases "each other" and "one another" can be used interchangeably simply for convenience unless stated otherwise. For example, an expression "different from each other" can be understood as different from one another. In another example, an expression "different from one another" can be understood as different from each other. In one or more examples, the number of elements involved in the foregoing expression can be two. In one or more examples, the number of elements involved in the foregoing expression can be more than two.

In one or more aspects, the phrases "one or more among" and "one or more of" can be used interchangeably simply for convenience unless stated otherwise.

The term "or" means "inclusive or" rather than "exclusive or." For example, unless otherwise stated or clear from the context, the expression that "x uses a or b" means any one of natural inclusive permutations. For example, "a or b" can mean "a," "b," or "a and b." For example, "a, b or c" can mean "a," "b," "c," "a and b," "b and c," "a and c," or "a, b and c."

Unless otherwise defined, the terms (including technical and scientific terms) used herein have the same meaning as commonly understood by one of ordinary skill in the art to which example aspects belong. It should be further understood that terms, such as those defined in commonly used dictionaries, should be interpreted as having a meaning that is, for example, consistent with their meaning in the context of the relevant art and should not be interpreted in an idealized or overly formal sense, unless expressly defined otherwise herein.

The terms used herein have been selected as being general in the related technical field; however, there can be other terms depending on the development and/or change of technology, convention, preference of technicians, and so on. Therefore, the terms used herein should not be understood as limiting technical ideas but should be understood as examples of the terms for describing example aspects.

Further, in a specific case, a term can be arbitrarily selected by an applicant, and in this case, the detailed meaning thereof is described herein. Therefore, the terms used herein should be understood based on not only the name of the terms, but also the meaning of the terms and the content hereof.

Furthermore, "X-axis direction," "Y-axis direction," and "Z-axis direction," should not be construed by a geometric relation only of a mutual vertical relation and can have broader directionality within the range that elements of the present disclosure can act functionally.

In the present disclosure, a display apparatus may include a display apparatus such as an organic light emitting display (OLED) module or a liquid crystal module (LCM) including a display panel and a driver for driving the display panel. In addition, the display apparatus may include a set device (or a set apparatus) or a set electronic apparatus such as a notebook computer, a TV, a computer monitor, an equipment apparatus including an automotive apparatus or another type apparatus for vehicles, or a mobile electronic device such as a smartphone or an electronic pad, which is a complete product (or a final product) including an LCM or an OLED module, or the like.

Therefore, the display apparatus in the present disclosure may include a display apparatus itself, such as an LCM or an OLED module, and a set device which is a final consumer device or an application product including the LCM or the OLED module.

Moreover, in some embodiments, an LCM or an OLED module which is configured a display panel and a driver or the like may be referred to as a display apparatus, and an electronic apparatus which is a final product including an LCM or an OLED module may be referred to as a set apparatus. For example, the display apparatus may include a display panel, such as an LCD or an OLED, and a source printed circuit board (PCB) which is a controller for driving the display panel. The set apparatus may further include a set PCB which is a set controller electrically connected to the source PCB to overall control the set apparatus.

A display panel applied to the present embodiment may use all types of display panels such as a liquid crystal display panel, an organic light emitting diode (OLED) display panel, and an electroluminescent display panel, but embodiments of the present disclosure are not limited. For example, the display panel may be a display panel which is vibrated by a vibration apparatus according to an embodiment of the present disclosure to generate a sound. A display panel applied to a display apparatus according to an embodiment of the present disclosure may be not limited to a shape or a size thereof.

According to one or more embodiments of the present disclosure, when the display panel is the liquid crystal display panel, the display panel may include a plurality of gate lines, a plurality of data lines, and a pixel formed in an intersection area of the gate lines and the data lines a plurality of gate lines, a plurality of data lines, and a plurality of pixels respectively provided in a plurality of pixel areas defined by intersections of the gate lines and the data lines. In addition, the display panel may include an array substrate including a thin film transistor (TFT) which is a switching element for adjusting a light transmittance of each pixel, an upper substrate including a color filter and/or a black matrix, and a liquid crystal layer between the array substrate and the upper substrate.

When the display panel is the organic light emitting display panel, the display panel may include a plurality of gate lines, a plurality of data lines, and a plurality of pixels respectively provided in a plurality of pixel areas defined by intersections of the gate lines and the data lines. In addition, the display panel may include an array substrate including a TFT which is an element for selectively applying a voltage to each of the pixels, an organic light emitting device layer on the array substrate, and an encapsulation substrate disposed on the array substrate to cover the organic light emitting device layer, or the like. The encapsulation substrate may protect the TFT and the organic light emitting device layer or the like from an external impact and may prevent water or oxygen from penetrating into the organic light emitting device layer. Moreover, a layer formed on the array substrate may include an inorganic light emitting layer (for example, a nano-sized material layer) and a quantum dot light emitting layer, or the like. As another embodiment of the present disclosure, the layer formed on the array substrate may include a micro light emitting diode.

The display panel may further include a backing such as a metal plate attached at the display panel. However, the present embodiment is not limited to the metal plate, and the display panel may include another structure made of other materials.

Features of various aspects of the present disclosure can be partially or entirely coupled to or combined with each other, can be technically associated with each other, and can be operated, linked, or driven together in various ways. Aspects of the present disclosure can be implemented or carried out independently from each other, or can be implemented or carried out together in a co-dependent or related relationship. In one or more aspects, the components of each apparatus according to various aspects of the present disclosure can be operatively coupled and configured.

In the following description, various example aspects of the present disclosure are described in detail with reference to the accompanying drawings. With respect to reference numerals to elements of each of the drawings, the same elements can be illustrated in other drawings, and like reference numerals can refer to like elements unless stated otherwise. The same or similar elements can be denoted by the same reference numerals even though they are depicted in different drawings.

In addition, for convenience of description, a scale, dimension, size, and thickness of each of the elements illustrated in the accompanying drawings can be different from an actual scale, dimension, size, and thickness, and thus, aspects of the present disclosure are not limited to a scale, dimension, size, and thickness illustrated in the drawings.

Figure 2:
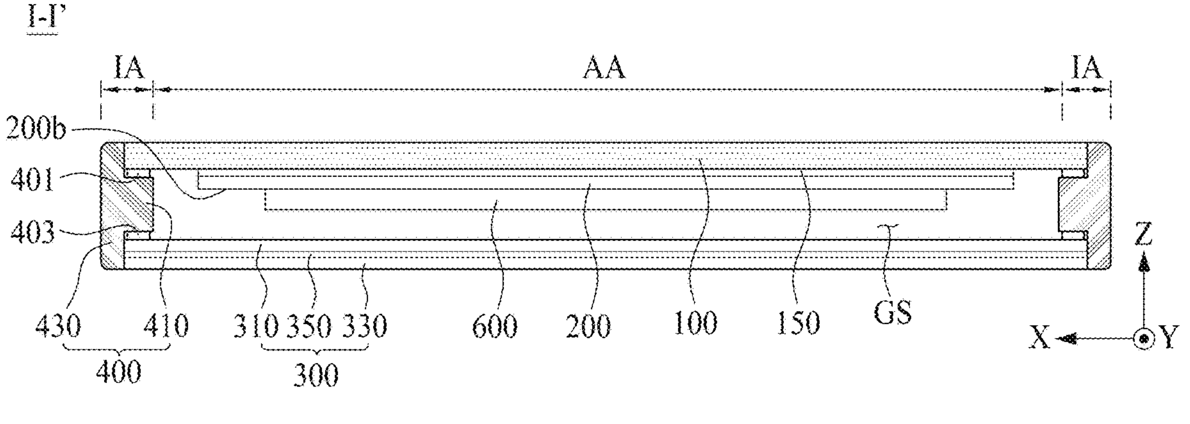
FIG. 2 is a cross-sectional view taken along line I-I' illustrated in FIG. 1 according to an embodiment of the present disclosure.

FIG. 1 illustrates an apparatus according to an embodiment of the present disclosure. FIG. 2 is a cross-sectional view taken along line I-I' illustrated in FIG. 1 according to an embodiment of the present disclosure.

Figure 3:
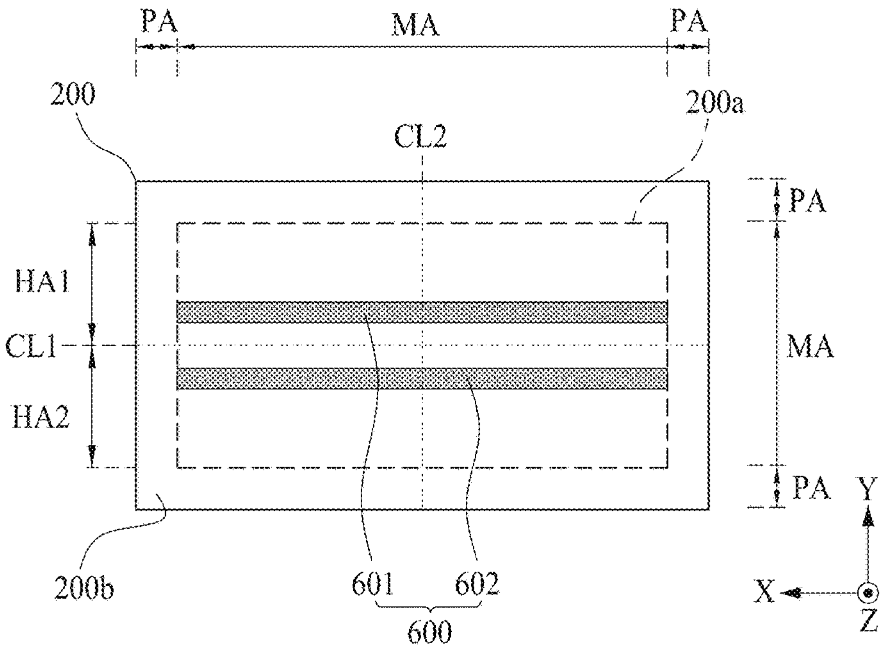
FIG. 3 illustrates a vibration apparatus and a pad member illustrated in FIG. 2 according to an embodiment of the present disclosure.

With reference to FIGS. 1 to 3, an apparatus according to an embodiment of the present disclosure may implement or realize a display apparatus, a sound apparatus, a sound output apparatus, a vibration apparatus, a vibration generating apparatus, a sound bar, a sound system, a sound apparatus for electronic apparatuses, a sound apparatus for displays, a sound apparatus for vehicular apparatuses, or a sound bar for vehicular apparatuses, or the like. For example, the vehicular apparatus may include a vehicle, an automobile, a train, a ship, or an aircraft, but embodiments of the present disclosure are not limited thereto and can represent any element to which the acoustic apparatus of the present disclosure can be applied. The vehicle or the vehicular apparatus may be any other entity or element in which the acoustic apparatus of the present application can be applied or used. In addition, the apparatus according to an embodiment of the present disclosure may implement or realize an analog signage or a digital signage, or the like such as an advertising signboard, a poster, or a noticeboard, or the like.

The apparatus according to an embodiment of the present disclosure may include a vibration member 100 and a vibration apparatus 200.

The vibration member 100 may generate a vibration or may output a sound (or a sound wave), based on a displacement (or driving or vibration) of the vibration apparatus 200. The vibration member 100 may be a vibration object, a signage panel, a passive vibration plate, a front member, a vibration panel, a display panel, a sound panel, a passive vibration panel, a sound output plate, or a sound vibration plate, or the like, but embodiments of the present disclosure are not limited thereto. Hereinafter, an example where the vibration member 100 is a display panel will be described.

The vibration member 100 according to an embodiment of the present disclosure may include a polygonal shape including a rectangular shape or a square shape, but embodiments of the present disclosure are not limited thereto. The vibration member 100 may include a horizontal length (or a widthwise length) parallel to a first direction X and a vertical length (or a lengthwise length) parallel to a second direction Y. For example, with respect to a same plane, the first direction X may be a first horizontal direction, or a first horizontal length direction or a long-side length direction of the vibration member 100, and the second direction Y may be a second horizontal direction, or a second horizontal length direction or a short-side length direction of the vibration member 100 which are orthogonal to the first direction X.

The vibration member 100 may include a structure having totally a same thickness, but embodiments of the present disclosure are not limited thereto. For example, the vibration member 100 may include a plate structure having totally a same thickness, but embodiments of the present disclosure are not limited thereto. For example, the vibration member 100 may include a non-planar structure having a convex portion and/or a concave portion.

According to an embodiment of the present disclosure, the vibration member 100 may implement or realize a signage panel such as an analog signage or a digital signage, or the like such as an advertising signboard, a poster, or a noticeboard, or the like. For example, when the vibration member 100 implements the signage panel, the analog signage may include signage content such as a sentence, a picture, and a sign, or the like. The signage content may be disposed at the vibration member 100 to be visible or visual. For example, the signage content may be attached at one surface of the vibration member 100. For example, the signage content may be directly attached at one surface of the vibration member 100. For example, the signage content may be printed on a medium such as paper or the like, and the medium with the signage content printed thereon may be directly attached at one surface of the vibration member 100. For example, the vibration member 100 according to an embodiment of the present disclosure may include an opaque vibration plate, and thus, the signage content may be attached at one surface of the vibration member 100 to secure visibility.

The vibration member 100 which is the display panel 100 may display an electronic image or a digital image. For example, the display panel 100 may output light to display an image. The display panel 100 may be a curved display panel, or may be all type of display panel such as a liquid crystal display panel, an organic light-emitting display panel, a quantum dot light-emitting display panel, a micro light-emitting diode display panel, and an electrophoresis display panel, or the like. The display panel 100 may be a flexible display panel. For example, the display panel 100 may be a flexible light emitting display panel, a flexible electrophoretic display panel, a flexible electro-wetting display panel, a flexible micro light emitting diode display panel, or a flexible quantum dot light emitting display panel, but embodiments of the present disclosure are not limited thereto.

The display panel 100 according to an embodiment of the present disclosure may include a display area AA configured to display an image. The display panel 100 may include a non-display area IA adjacent to or surrounding the display area AA, but embodiments of the present disclosure are not limited thereto.

The display panel 100 according to an embodiment of the present disclosure may include a pixel array part disposed at the substrate. The pixel array part may include a plurality of pixels which display an image based on a signal supplied to the signal lines. The signal lines may include a gate line, a data line, and a pixel driving power line, or the like, but embodiments of the present disclosure are not limited thereto. The display panel 100 according to an embodiment of the present disclosure may display an image in a type such as a top emission type, a bottom emission type, a dual emission type, or the like based on a structure of the pixel array part. In the top emission type, an image may be displayed by outputting visible light generated from the pixel array part to the forward direction of a base substrate. In the bottom emission type, an image may be displayed by outputting visible light generated from the pixel array part to the backward direction of the base substrate.

Each of the plurality of pixels may include a pixel circuit layer including a driving thin film transistor (TFT) provided at the pixel area which is configured by a plurality of gate lines and/or a plurality of data lines, an anode electrode electrically connected to the driving TFT, a light emitting device formed over the anode electrode, and a cathode electrode electrically connected to the light emitting device.

The driving TFT may be configured at a transistor region of each pixel area disposed over a substrate. The driving TFT may include a gate electrode, a gate insulation layer, a semiconductor layer, a source electrode, and a drain electrode. The semiconductor layer of the driving TFT may include silicon such as amorphous silicon (a-Si), polysilicon (poly-Si), or low temperature poly-Si or the like, or may include oxide such as indium-gallium-zinc-oxide (IGZO), but embodiments of the present disclosure are not limited thereto.

The anode electrode (or pixel electrode) may be provided at an opening region disposed at each pixel area and may be electrically connected to the driving TFT.

The light emitting device according to an embodiment of the present disclosure may include a light emitting device layer formed over an anode electrode. The light emitting device layer may be implemented to emit light having a same color (for example, white light) for each pixel of the plurality of pixels, or may be implemented to emit light having a different color (for example, red light, green light, or blue light) for each pixel. The cathode electrode (or a common electrode) may be connected to the light emitting device layer provided at each pixel area in common. For example, the light emitting device layer may have a stack structure including a single structure or two or more structures including a same color for each pixel. For example, the light emitting device layer may emit red, green, and blue light for each red, green, and blue subpixel.

As another embodiment of the present disclosure, the light emitting device layer may have a stack structure including two or more emission parts including one or more different colors for each pixel. The emission part may be referred to as a stack, but the terms are not limited thereto. The two or more emission parts may include a first emission part and a second emission part. The first emission part and the second emission part may each include a red emission layer, a green emission layer, and a blue emission layer which respectively emit red light, green light, and blue light, for each subpixel. Two or more emission layers included in the first emission part and the second emission part may be emission layers which emit lights having a same color. As another example, a first emission layer included in the first emission part may be a blue emission layer, a sky blue emission layer, a dark blue emission layer, a blue emission layer and a red emission layer, a sky blue emission layer and a red emission layer, or a dark blue emission layer and a red emission layer, but embodiments of the present disclosure are not limited thereto. For example, a second emission layer included in the second emission part may be a yellow emission layer, a yellow-green emission layer, a green emission layer, a yellow emission layer and a red emission layer, a yellow-green emission layer and a red emission layer, a green emission layer and a red emission layer, a combination of a yellow emission layer, a yellow-green emission layer, and a green emission layer, a combination of a yellow emission layer, a yellow-green emission layer, a green emission layer, and a red emission layer, a combination of two yellow-green emission layers and one green emission layer, a combination of one yellow-green emission layer and two green emission layers, a combination of two yellow-green emission layers, one green emission layer, and a red emission layer, or a combination of one yellow-green emission layer, two green emission layers, and a red emission layer, but embodiments of the present disclosure are not limited thereto. A charge generating layer may be provided between the first emission part and the second emission part. The charge generating layer may have a PN junction structure and may include a P-type charge generating layer and an N-type charge generating layer. Each of the first emission part and the second emission part may include one or more of a hole injection layer, a hole transport layer, a hole blocking layer, an electron blocking layer, an electron transport layer, and an electron injection layer, but embodiments of the present disclosure are not limited thereto.

The two or more emission parts may include a first emission part, a second emission part, and a third emission part. A first emission layer included in the first emission part may be as described above. A second emission layer included in the second emission part may be as described above. A third emission layer included in the third emission part may be configured to be equal to the first emission layer, but embodiments of the present disclosure are not limited thereto. A first charge generating layer may be provided between the first emission part and the second emission part. The first charge generating layer may have a PN junction structure and may include a P-type charge generating layer and an N-type charge generating layer. A second charge generating layer may be provided between the second emission part and the third emission part. The second charge generating layer may have a PN junction structure and may include a P-type charge generating layer and an N-type charge generating layer. Each of the first emission part, the second emission part, and the third emission part may include one or more of a hole injection layer, a hole transport layer, a hole blocking layer, an electron blocking layer, an electron transport layer, and an electron injection layer, but embodiments of the present disclosure are not limited thereto.

The two or more emission parts may include a first emission part, a second emission part, a third emission part, and a fourth emission part. Emission layers of two or more of the first emission part, the second emission part, the third emission part, and the fourth emission part may be configured as emission layers which emit lights having a same color. For example, emission layers of two or more of the first emission part, the second emission part, the third emission part, and the fourth emission part may be configured as blue emission layers, but embodiments of the present disclosure are not limited thereto. Emission layers of at least one or more of the first emission part, the second emission part, the third emission part, and the fourth emission part may include a blue emission layer and another emission layer. For example, emission layers of at least one or more of the first emission part, the second emission part, the third emission part, and the fourth emission part may be a yellow emission layer, a yellow-green emission layer, a green emission layer, a yellow emission layer and a red emission layer, a yellow-green emission layer and a red emission layer, a green emission layer and a red emission layer, a combination of a yellow emission layer, a yellow-green emission layer, and a green emission layer, a combination of a yellow emission layer, a yellow-green emission layer, a green emission layer, and a red emission layer, a combination of two yellow-green emission layers and one green emission layer, a combination of one yellow-green emission layer and two green emission layers, a combination of two yellow-green emission layers, one green emission layer, and a red emission layer, a combination of one yellow-green emission layer, two green emission layers, and a red emission layer, but embodiments of the present disclosure are not limited thereto. A first charge generating layer may be provided between the first emission part and the second emission part. The first charge generating layer may have a PN junction structure and may include a P-type charge generating layer and an N-type charge generating layer. A second charge generating layer may be provided between the second emission part and the third emission part. The second charge generating layer may have a PN junction structure and may include a P-type charge generating layer and an N-type charge generating layer. A third charge generating layer may be provided between the third emission part and the fourth emission part. The third charge generating layer may have a PN junction structure and may include a P-type charge generating layer and an N-type charge generating layer. Each of the first emission part, the second emission part, the third emission part, and the fourth emission part may include one or more of a hole injection layer, a hole transport layer, a hole blocking layer, an electron blocking layer, an electron transport layer, and an electron injection layer, but embodiments of the present disclosure are not limited thereto.

The light emitting device according to another embodiment of the present disclosure may include a micro light emitting diode device electrically connected to each of an anode electrode and a cathode electrode. The micro light emitting diode device may be a light emitting diode implemented as an integrated circuit (IC) or chip type. The micro light emitting diode device may include a first terminal electrically connected to the anode electrode and a second terminal electrically connected to the cathode electrode. The cathode electrode may be connected to the second terminal of the micro light emitting diode device provided at each pixel area in common.

An encapsulation part may be formed on the substrate to surround the pixel array part, thereby preventing oxygen or water from penetrating into the light emitting device layer of the pixel array part. The encapsulation part according to an embodiment of the present disclosure may be formed in a multi-layer structure where an organic material layer and an inorganic material layer are alternately stacked, but embodiments of the present disclosure are not limited thereto. The inorganic material layer may prevent oxygen or water from penetrating into a layer of the light emitting device layer in the pixel array part. The organic material layer may be formed to have a thickness which is relatively thicker than the inorganic material layer, to cover particles occurring in a manufacturing process, but embodiments of the present disclosure are not limited thereto. For example, the encapsulation part may include a first inorganic layer, an organic layer on the first inorganic layer, and a second inorganic layer on the organic layer. The organic layer may be a particle cover layer, but the term is not limited thereto. The touch panel may be disposed on the encapsulation part, or may be disposed at a rear surface of the pixel array part or within the pixel array part.

The display panel 100 according to an embodiment of the present disclosure may include a first substrate, a second substrate, and a liquid crystal layer. The first substrate may be an upper substrate or a thin film transistor (TFT) array substrate. For example, the first substrate may include a pixel array (or a display part or a display area) including a plurality of pixels which are respectively formed at pixel areas configured by a plurality of gate lines and/or a plurality of data lines. Each of the plurality of pixels may include a TFT connected to a gate line and/or a data line, a pixel electrode connected to the TFT, and a common electrode which is formed adjacent to the pixel electrode and is supplied with a common voltage.

The first substrate may further include a pad part provided at a first periphery (or a first non-display part) and a gate driving circuit provided at a second periphery (or a second non-display part).

The pad part may supply a signal, supplied from an outside, to the pixel array part and/or the gate driving circuit. For example, the pad part may include a plurality of data pads connected to a plurality of data lines through a plurality of data link lines and/or a plurality of gate pads connected to the gate driving circuit through a gate control signal line. For example, a size of the first substrate may be greater than the second substrate, but embodiments of the present disclosure are not limited thereto.

The gate driving circuit may be embedded (or integrated) into a second periphery portion of the first substrate so as to be connected to the plurality of gate lines. For example, the gate driving circuit may be implemented with a shift register including a transistor, which is formed through a same process as the TFT provided at the pixel area. The gate driving circuit according to another embodiment of the present disclosure may be implemented as an integrated circuit (IC) and may be provided at a panel driving circuit, without being embedded into the first substrate.

The second substrate may be a lower substrate or a color filter array substrate. For example, the second substrate may include a pixel pattern (or a pixel defining pattern) including an opening area overlapping with the pixel area formed at the first substrate, and a color filter layer formed at the opening area. The second substrate may have a size which is smaller than the first substrate, but embodiments of the present disclosure are not limited thereto. For example, the second substrate may overlap a remaining portion, other than the first periphery, of the first substrate. The second substrate may be attached to a remaining portion, other than the first periphery, of the first substrate with a liquid crystal layer therebetween by a sealant.

The liquid crystal layer may be disposed between the first substrate and the second substrate. The liquid crystal layer may include a liquid crystal including liquid crystal molecules where an alignment direction thereof is changed based on an electric field generated by the common voltage and a data voltage applied to a pixel electrode for each pixel.

A second polarization member may be attached at a lower surface of the second substrate and may polarize light which is incident from the backlight and travels to the liquid crystal layer. A first polarization member may be attached at an upper surface of the first substrate and may polarize light which passes through the first substrate and is output to the outside.

The display panel 100 according to an embodiment of the present disclosure may drive the liquid crystal layer based on an electric field which is generated in each pixel by the data voltage and the common voltage applied to each pixel, and thus, may display an image based on light passing through the liquid crystal layer.

In display panel 100 according to another embodiment of the present disclosure, the first substrate may be implemented as the color filter array substrate, and the second substrate may be implemented as the TFT array substrate. For example, the display panel 100 according to another embodiment of the present disclosure may have a type where an upper portion and a lower portion of the display panel 100 according to an embodiment of the present disclosure are reversed therebetween. For example, a pad part of the display panel 100 according to another embodiment of the present disclosure may be covered by a separate mechanism or structure.

The display panel 100 according to another embodiment of the present disclosure may include a bending part that may be bent or curved to have a curved shape or a certain curvature radius.

The bending part of the display panel 100 may be in at least one or more of one periphery portion and the other periphery portion of the display panel 100, which are parallel to each other. The one periphery portion and/or the other periphery portion, where the bending part is implemented, of the display panel 100 may include only the non-display area IA, or may include a periphery portion of the display area AA and the non-display area IA. The display panel 100 including the bending part implemented by bending of the non-display area IA may have a one-side bezel bending structure or a both-side bezel bending structure. In addition, the display panel 100 including the bending part implemented by bending of the periphery portion of the display area AA and the non-display area IA may have a one-side active bending structure or a both-side active bending structure.

The vibration apparatus 200 may be disposed at a rear surface (or a backside surface) of the display panel (or vibration member) 100. For example, the vibration apparatus 200 may vibrate the display panel (or vibration member) 100 at the rear surface (or a backside surface) of the display panel (or vibration member) 100, thereby providing a sound and/or a haptic feedback based on a vibration of the display panel (or vibration member) 100 to a user (or a viewer). For example, the vibration apparatus 200 may be implemented at the rear surface of the display panel (or vibration member) 100 to directly vibrate the display panel (or vibration member) 100. For example, the vibration apparatus 200 may be a vibration generating apparatus, a displacement apparatus, a sound apparatus, or a sound generating apparatus, but embodiments of the present disclosure are not limited thereto.

As an embodiment of the present disclosure, the vibration apparatus 200 may vibrate based on a vibration driving signal synchronized with an image displayed by the display panel 100 to vibrate the display panel 100. As another embodiment of the present disclosure, the vibration apparatus 200 may be disposed on the display panel 100, and may vibrate according to a haptic feedback signal (or a tactile feedback signal) synchronized with a user touch applied to a touch panel (or a touch sensor layer) embedded into the display panel 100 to vibrate the display panel 100. Accordingly, the display panel 100 may vibrate based on a vibration of the vibration apparatus 200 to provide a user (or a viewer) with at least one of a sound and a haptic feedback.

The vibration apparatus 200 according to an embodiment of the present disclosure may be implemented to have a size corresponding to the display area AA of the display panel 100. A size of the vibration apparatus 200 may be 0.9 to 1.1 times a size of the display area AA, but embodiments of the present disclosure are not limited thereto. For example, a size of the vibration apparatus 200 may be a same as or smaller than the size of the display area AA. For example, a size of the vibration apparatus 200 may be a same as or approximately same as the display area AA of the display panel 100, and thus, the vibration apparatus 200 may cover a most region of the display panel 100 and a vibration generated by the vibration apparatus 200 may vibrate a whole portion of the display panel 100, and thus, localization of a sound may be high, and satisfaction of a user may be improved. Further, a contact area (or a panel coverage) between the display panel 100 and the vibration apparatus 200 may increase, and thus, a vibration region of the display panel 100 may increase, thereby improving a sound of a middle-low-pitched sound band generated based on a vibration of the display panel 100. Moreover, a vibration apparatus 200 applied to a large-sized display apparatus may vibrate the entire display panel 100 having a large size (or a large area), and thus, localization of a sound based on a vibration of the display panel 100 may be further enhanced, thereby realizing an improved sound effect. Therefore, the vibration apparatus 200 according to an embodiment of the present disclosure may be disposed at the rear surface of the display panel 100 to sufficiently vibrate the display panel 100 in a vertical (or front-to-rear) direction, thereby outputting a desired sound to a forward side (or a forward direction) in front of the apparatus or the display apparatus. For example, the vibration apparatus 200 according to an embodiment of the present disclosure may be disposed at the rear surface of the display panel 100 to sufficiently vibrate the display panel 100 in a vertical (or front-to-rear) direction with respect to a first direction (X) of the display panel 100, thereby outputting a desired sound to a forward side (or a forward direction) in front of the apparatus or the display apparatus.

The vibration apparatus 200 according to an embodiment of the present disclosure may be implemented as a film-type. Since the vibration apparatus 200 may be implemented as a film-type, it may have a thickness which is thinner than the display panel 100, and thus, a thickness of the display apparatus may not increase due to the arrangement of the vibration apparatus 200. For example, the vibration apparatus 200 may be a sound generating module, a sound generating apparatus, a sound generating device, a vibration generating apparatus, a vibration generating device, a displacement apparatus, a sound apparatus, a film actuator, a film-type piezoelectric composite actuator, a film speaker, a film-type piezoelectric speaker, a film-type piezoelectric composite speaker, or the like, which uses the display panel 100 as a vibration plate, but embodiments of the present disclosure are not limited thereto.

As another embodiment of the present disclosure, the vibration apparatus 200 may not be disposed at the rear surface of the display panel 100 and may be applied to a non-display panel instead of the display panel. For example, the non-display panel may be one or more of metal, plastic, fiber, leather, wood, cloth, rubber, carbon, glass, paper, a vehicle interior material, a vehicle ceiling material, a vehicle exterior material, a building indoor ceiling, and an aircraft interior material, but embodiments of the present disclosure are not limited thereto.

According to an embodiment of the present disclosure, the vibration member may include a display panel including a pixel configured to display an image, or may include a non-display panel. For example, the vibration member may include a display panel including a pixel configured to display an image, or may include one or more of metal, plastic, fiber, leather, wood, cloth, rubber, carbon, glass, paper, a vehicle interior material, a vehicle ceiling material, a vehicle exterior material, a vehicle glass window, a building indoor ceiling, a building glass window, a building interior material, an aircraft interior material, and an aircraft glass window, or the like, but embodiments of the present disclosure are not limited thereto. For example, the vibration member may include one or more of a display panel including a pixel configured to display an image, a screen panel on which an image is to be projected from a display apparatus, a lighting panel, a signage panel, a vehicular interior material, a vehicular ceiling material, a vehicular glass window (or, a vehicular window), a vehicular exterior material, a building ceiling material, a building interior material, a building glass window, an aircraft interior material, an aircraft glass window, and a mirror, but embodiments of the present disclosure are not limited thereto. For example, the non-display panel may be a light emitting diode lighting panel (or apparatus), an organic light emitting lighting panel (or apparatus), or an inorganic light emitting lighting panel (or apparatus), and the like, but embodiments of the present disclosure are not limited thereto. For example, the vibration member may include a display panel including a pixel displaying an image, or may include one or more of a light emitting diode lighting panel (or apparatus), an organic light emitting lighting panel (or apparatus), or an inorganic light emitting lighting panel (or apparatus), but embodiments of the present disclosure are not limited thereto.

According to another embodiment of the present disclosure, the vibration member may include a plate, and the plate may include a metal material, or may include a single nonmetal materials or composite nonmetal materials of any one of wood, plastic, glass, cloth, and leather, but embodiments of the present disclosure are not limited thereto. According to another embodiment of the present disclosure, the vibration member may include one or more of metal, plastic, fiber, leather, wood, cloth, rubber, carbon, glass, and paper, but embodiments of the present disclosure are not limited thereto. For example, the paper may be a cone paper for speakers. For example, the cone paper may be formed of pulp or foamed plastic, but embodiments of the present disclosure are not limited thereto. For example, the vibration member may be a vibration object, a vibration plate, or a front member, but embodiments of the present disclosure are not limited thereto.

The apparatus according to an embodiment of the present disclosure may further include a connection member (or a first connection member) 150 disposed between the display panel 100 and the vibration apparatus 200.

The connection member 150 may be disposed between the display panel 100 and the vibration apparatus 200, and may connect or couple the vibration apparatus 200 to the rear surface of the display panel 100. For example, the vibration apparatus 200 may be connected or coupled to the rear surface of the display panel 100 by the connection member 150, and thus, may be supported by or disposed at the rear surface of the display panel 100.

The connection member 150 according to an embodiment of the present disclosure may include a material including an adhesive layer which is good in adhesive force or attaching force with respect to each of the rear surface of the display panel 100 and the vibration apparatus 200. For example, the connection member 150 may include a foam pad, a double-sided foam pad, a double-sided foam tape, a double-sided tape, or an adhesive, or the like, but embodiments of the present disclosure are not limited thereto. For example, the adhesive layer of the connection member 150 may include epoxy, acrylic, silicone, or urethane, but embodiments of the present disclosure are not limited thereto. For example, the adhesive layer of the connection member 150 may include an acrylic-based material (or substance) which is relatively better in adhesive force and hardness of acrylic and urethane. Accordingly, a transmission efficiency of the vibration force (or displacement force) transmitted from the vibration apparatus 200 to the display panel 100 may be increased.

The adhesive layer of the connection member 150 may further include an additive, such as a tackifier or an adhesion enhancing agent, a wax component, an anti-oxidation agent, or the like. The additive may prevent or reduce the connection member 150 from being detached (stripped) from the display panel 100 by a vibration of the vibration apparatus 200. For example, the tackifier may be rosin derivative or the like, and the wax component may be paraffin wax or the like, and the anti-oxidation agent may be a phenol-based anti-oxidation agent, such as thioester, but embodiments of the present disclosure are not limited thereto.

The connection member 150 according to another embodiment of the present disclosure may further include a hollow portion provided between the display panel 100 and the vibration apparatus 200. The hollow portion of the connection member 150 may provide an air gap between the display panel 100 and the vibration apparatus 200. Due to the air gap, a sound wave (or a sound pressure) based on a vibration of the vibration apparatus 200 may not be dispersed by the connection member 150, and may concentrate on the display panel 100. Thus, the loss of a vibration caused by the connection member 150 may be minimized, thereby increasing a sound pressure level characteristic of a sound generated based on a vibration of the display panel 100.

The apparatus according to an embodiment of the present disclosure may further include a supporting member 300 disposed at the rear surface of the display panel 100.

The supporting member 300 may be disposed at the rear surface of the vibration member (or display panel) 100 and the vibration apparatus 200. For example, the supporting member 300 may cover the rear surface of the display panel 100. For example, the supporting member 300 may cover an entire rear surface of the display panel 100 with a gap space GS therebetween. For example, the supporting member 300 may include at least one or more of a glass material, a metal material, and a plastic material, but embodiments of the present disclosure are not limited thereto. For example, the supporting member 300 may be a rear surface structure, a supporting structure, a supporting cover, a rear member, a case, a housing, or a set structure, but embodiments of the present disclosure are not limited thereto. For example, the supporting member 300 may be a cover bottom, a plate bottom, a back cover, a base frame, a metal frame, a metal chassis, a chassis base, or m-chassis, or the like, but embodiments of the present disclosure are not limited thereto. For example, the supporting member 300 may be implemented as an arbitrary type frame or a plate-shaped structure disposed at the rear surface of the display panel 100.

The supporting member 300 according to an embodiment of the present disclosure may include a first supporting member 310 and a second supporting member 330.

The first supporting member 310 may cover the rear surface of the display panel 100. For example, the first supporting member 310 may cover an entire rear surface of the display panel 100. For example, the first supporting member 310 may be a member which covers an entire rear surface of the display panel 100. For example, the first supporting member 310 may include one or more materials of a glass material, a metal material, and a plastic material, but embodiments of the present disclosure are not limited thereto. For example, the first supporting member 310 may be a first rear structure, a first supporting structure, a first supporting cover, a first back cover, a first rear member, an inner plate, or an internal cover, but embodiments of the present disclosure are not limited thereto.

The first supporting member 310 may be spaced apart from a rearmost surface of the display panel 100 with a gap space GS therebetween or may be spaced apart from the vibration apparatus 200 with a gap space GS therebetween. For example, the gap space GS may be an air gap, an inner space, a vibration space, a sealing space, or a sound resonance box, or the like, but embodiments of the present disclosure are not limited thereto.

The second supporting member 330 may be disposed at a rear surface of the first supporting member 310. The second supporting member 330 may be a member which covers an entire rear surface of the first supporting member 310. For example, the second supporting member 330 may include at least one or more of a glass material, a metal material, and a plastic material, but embodiments of the present disclosure are not limited thereto. For example, the second supporting member 330 may be a second rear structure, a second supporting structure, a second supporting cover, a second back cover, a second rear member, an external cover, an outer plate, a rear plate, a back plate, or a rear cover, but embodiments of the present disclosure are not limited thereto.

The supporting member 300 according to an embodiment of the present disclosure may further include a connection member (or a second connection member) 350.

The connection member 350 may be disposed between the first supporting member 310 and the second supporting member 330. For example, the first supporting member 310 and the second supporting member 330 may be coupled or connected to each other by the connection member 350. For example, the connection member 350 may be an adhesive resin, a double-sided tape, a double-sided foam tape, a double-sided foam pad, or a double-sided adhesive foam pad, but embodiments of the present disclosure are not limited thereto. For example, the connection member 350 may have elasticity for absorbing an impact, but embodiments of the present disclosure are not limited thereto. As an embodiment of the present disclosure, the connection member 350 may be disposed at an entire region between the first supporting member 310 and the second supporting member 330. As another embodiment of the present disclosure, the connection member 350 may be provided in a mesh structure including an air gap between the first supporting member 310 and the second supporting member 330.

The apparatus according to an embodiment of the present disclosure may further include a middle frame 400.

The middle frame 400 may be disposed between a rear periphery portion of the display panel 100 and a front periphery portion of the supporting member 300. The middle frame 400 may support one or more of a periphery portion of the display panel 100 and a periphery portion of the supporting member 300, and may surround one or more of side surfaces of each of the display panel 100 and the supporting member 300. The middle frame 400 may provide a gap space GS between the display panel 100 and the supporting member 300. The middle frame 400 may be referred to as a connection member, a frame, a frame member, an intermediate member, a side cover member, a middle cabinet, a middle cover, or a middle chassis, or the like, but embodiments of the present disclosure are not limited thereto.

The middle frame 400 according to an embodiment of the present disclosure may include a first supporting portion 410 and a second supporting portion 430. For example, the first supporting portion 410 may be a supporting portion, but embodiments of the present disclosure are not limited thereto. For example, the second supporting portion 430 may be a sidewall portion, but embodiments of the present disclosure are not limited thereto.

The first supporting portion 410 may be disposed between the rear periphery of the display panel 100 and the front periphery of the supporting member 300, and thus, may provide a gap space GS between the display panel 100 and the supporting member 300. A front surface of the first supporting portion 410 may be coupled or connected to the rear periphery of the display panel 100 by a first frame connection member 401. A rear surface of the first supporting portion 410 may be coupled or connected to the front periphery portion of the supporting member 300 by a second frame connection member 403. For example, the first supporting portion 410 may have a single picture frame structure having a tetragonal shape, or may include a frame structure having a plurality of divided bar shapes, but embodiments of the present disclosure are not limited thereto.

The second supporting portion 430 may be disposed in parallel with a thickness direction Z of the display apparatus or the apparatus. For example, the second supporting portion 430 may be vertically coupled to an outer surface of the first supporting portion 410 in parallel with a thickness direction Z of the display apparatus or the apparatus. The second supporting portion 430 may surround one or more of an outer surface of the display panel 100 and an outer surface of the supporting member 300, thereby protecting the outer surface of each of the display panel 100 and the supporting member 300. The first supporting portion 410 may protrude from an inner surface of the second supporting portion 430 toward the gap space GS between the display panel 100 and the support member 300.

The apparatus according to an embodiment of the present disclosure may include a panel connection member instead of the middle frame 400.

The panel connection member (or the connection member) may be disposed between the rear periphery portion of the display panel 100 and the front periphery portion of the supporting member 300 and may provide the gap space GS between the display panel 100 and the supporting member 300. The panel connection member may be disposed between the rear periphery portion of the display panel 100 and the front periphery portion of the supporting member 300 to adhere the display panel 100 and the support member 300. For example, the panel connection member may be a double-sided tape, a single-sided tape, a double-sided foam tape, a single-sided foam tape, a double-sided foam pad, a single-sided foam pad, or a double-sided adhesive foam pad, but embodiments of the present disclosure are not limited thereto. For example, an adhesive layer of the panel connection member may include epoxy-based, acrylic-based, silicone-based, or urethane-based, but embodiments of the present disclosure are not limited thereto. For example, an adhesive layer of the panel connection member may include a urethane-based material (or substance) which relatively has a ductile characteristic compared to acrylic. Accordingly, a vibration of the display panel 100 transferred to the support member 300 may be minimized.

In the apparatus according to an embodiment of the present disclosure, when the apparatus includes a panel connection member instead of a middle frame 400, the supporting member 300 may include a bending sidewall which is bent from an end (or an end portion) of the second supporting member 330 and surrounds one or more among an outer surface (or an outer sidewall) of each of the first supporting member 310, the panel connection member, and the display panel 100. The bending sidewall according to an embodiment of the present disclosure may have a single sidewall structure or a hemming structure. The hemming structure may be a structure where end portions of an arbitrary member are bent in a curve shape and overlap each other or are spaced apart from each other in parallel. For example, to enhance a sense of beauty in design, the bending sidewall may include a first bending sidewall, bent from one side of the second supporting member 330, and a second bending sidewall bent from the first bending sidewall to a region between the first bending sidewall and an outer surface of the display panel 100. The second bending sidewall may be spaced apart from an inner surface of the first bending sidewall. Therefore, the second bending sidewall may prevent the outer surface of the display panel 100 from contacting an inner surface of the first bending sidewall or may prevent a lateral-direction external impact from being transferred to the outer surface of the display panel 100.

According to another embodiment of the present disclosure, the middle frame 400 in the apparatus according to an embodiment of the present disclosure may be omitted. The apparatus may include the panel connection member or adhesive member instead of the middle frame 400. The apparatus according to another embodiment of the present disclosure may include a partition instead of the middle frame 400.

The apparatus according to an embodiment of the present disclosure may further include a pad member 600.

The pad member 600 may be disposed at a rear surface 200*b* (or a backside surface) of the vibration apparatus 200. For example, the pad member 600 may be connected to the rear surface 200*b* (or a backside surface) of the vibration apparatus 200. When the vibration apparatus 200 is attached to the vibration member 100, the vibration apparatus 200 may be attached or pressed to by a front surface of the vibration member 100 by the pad member 600. For example, the pad member 600 may be spaced apart from the supporting member 300. For example, the pad member 600 may be spaced apart from the first supporting portion 310 of the supporting member 300. For example, the pad member 600 may control a resonance of the vibration apparatus 200 and may enhance a sound of a middle-high-pitched sound band. The pad member 600 may be a resonance control device, a resonance controller, and a resonance pad, but embodiments of the present disclosure are not limited thereto. For example, the middle-pitched sound band may be 500 Hz or more, 600 Hz or more, 700 Hz or more, 800 Hz or more, 900 Hz or more or 1 kHz or more, but embodiments of the present disclosure are not limited thereto. For example, a high-pitched sound band may be 1 kHz or more or 3 kHz or more, but embodiments of the present disclosure are not limited thereto.

The pad member 600 may be configured to be smaller than or equal to a size of the vibration apparatus 200. For example, the pad member 600 may be configured to overlap the vibration apparatus 200.

The pad member 600 may be configured as a material which absorbs or adjusts a vibration. For example, the pad member 600 may be configured as one or more of a double-sided adhesive, a silicone-based polymer, paraffin wax, and an acrylic-based polymer, but embodiments of the present disclosure are not limited thereto.

According to an embodiment of the present disclosure, an adhesive member may be further configured between the pad member 600 and the vibration apparatus 200. For example, the adhesive may be further configured between the pad member 600 and the supporting member 300. The pad member 600 may be disposed between the vibration apparatus 200 and the supporting member 300 by the adhesive. For example, the adhesive may be a single-sided tape, a double-sided foam tape, a double-sided tape, a double-sided foam pad, or a double-sided foam tape, or the like, but embodiments of the present disclosure are not limited thereto. As an embodiment of the present disclosure, the pad member 600 may include the adhesive. For example, when the pad member 600 includes the adhesive, the adhesive may not be provided. When the pad member 600 includes a silicone-based material, the adhesive may not be provided.

According to an embodiment of the present disclosure, the pad member 600 is configured at the rear surface of the vibration apparatus 200, and thus, a resonance of the vibration apparatus 200 may be controlled, and a sound of the middle-high-pitched sound band may be enhanced.

Figure 4:
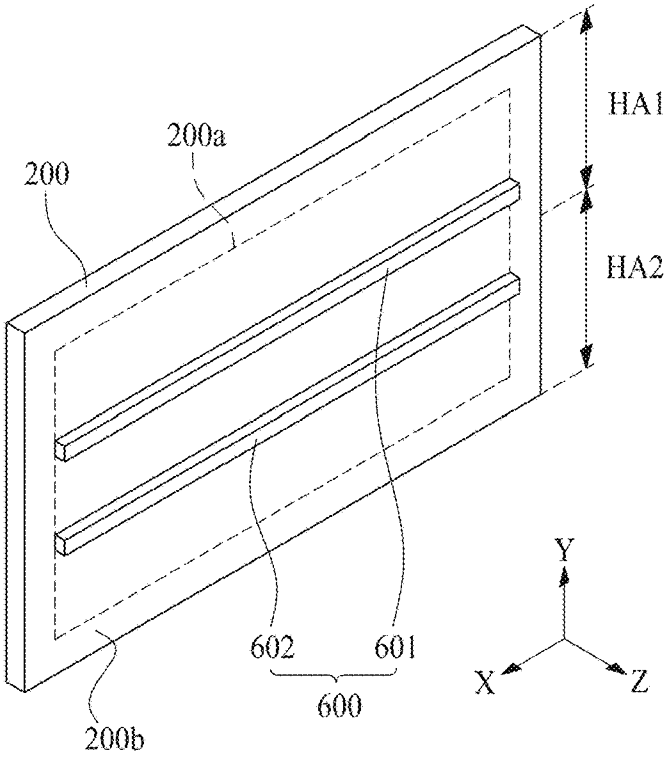
FIG. 4 is a perspective view illustrating an apparatus according to another embodiment of the present disclosure.

FIG. 3 illustrates a vibration apparatus and a pad member illustrated in FIG. 2 according to an embodiment of the present disclosure. FIG. 4 is a perspective view illustrating an apparatus according to another embodiment of the present disclosure.

With reference to FIGS. 3 and 4, the apparatus according to another embodiment of the present disclosure may include the vibration apparatus 200 and the pad member 600.

The vibration apparatus 200 may include a long side and a short side. For example, the long side of the vibration apparatus 200 may be parallel to a long side of the vibration member 100. A center line of a short side of the vibration apparatus 200 may be a first center line CL1. A center line of a long side of the vibration apparatus 200 may be a second center line CL2. The first center line CL1 and the second center line CL2 may intersect or be orthogonal to a center portion (or a middle portion) of the vibration apparatus 200.

The pad member 600 may be disposed in parallel with a long-side length direction of the vibration apparatus 200. For example, the pad member 600 may include a shape which extends from the long-side length direction of the vibration apparatus 200. For example, the pad member 600 may include a line shape which extends from the long-side length direction of the vibration apparatus 200. For example, a long side of the pad member 600 may be disposed in parallel with the long side of the vibration apparatus 200.

In FIGS. 3 and 4, a dotted line 200*a* may be a region where a vibration layer (211*a* of FIG. 10) is disposed, or may be a pad region (or a pad arrangement region) 200*a* where the pad member 600 is disposed. The pad member 600 may be disposed to overlap the vibration layer. For example, the pad region (or the pad arrangement region) 200*a* may have a size which is smaller than that of the vibration apparatus 200. For example, the pad region (or the pad arrangement region) 200*a* may have a size which is smaller than or equal to that of the region where the vibration layer (211*a* of FIG. 10) is disposed.

FIG. 4 is a perspective view illustrating a pad member 600 connected to or disposed at a rear surface 200*b* of a vibration apparatus 200. For example, the pad member 600 may be connected to or disposed at the rear surface 200*b* of the vibration apparatus 200, and thus, may support the vibration apparatus 200.

With reference to FIGS. 3 and 4, the vibration apparatus 200 may include a middle portion MA and a periphery portion PA. The vibration apparatus 200 may include a middle portion MA and a periphery portion PA in a long-side length direction of the vibration apparatus 200. The vibration apparatus 200 may include a middle portion MA and a periphery portion PA a short-side length direction of the vibration apparatus 200. The periphery portion PA of the vibration apparatus 200 may surround the middle portion MA. For example, the periphery portion PA in the long-side length direction of the vibration apparatus 200 may surround the middle portion MA. For example, the periphery portion PA in the short-side length direction of the vibration apparatus 200 may surround the middle portion MA. The middle portion MA of the vibration apparatus 200 may be between the periphery portions PA. For example, the middle portion MA in the long-side length direction of the vibration apparatus 200 may be between the periphery portions PA. For example, the middle portion MA in the short-side length direction of the vibration apparatus 200 may be between the periphery portions PA.

The pad member 600 may be disposed at the middle portion MA except the periphery portion PA of the vibration apparatus 200. For example, the pad member 600 may be disposed at the middle portion MA except the periphery portion PA in the long-side length direction of the vibration apparatus 200. For example, the pad member 600 may be disposed at the middle portion MA except the periphery portion PA in the short-side length direction of the vibration apparatus 200. For example, the middle portion MA in the short-side length direction of the vibration apparatus 200 and the middle portion MA in the long-side length direction of the vibration apparatus 200 may include a pad region (or a pad arrangement region) 200*a* where the pad member 600 is disposed. For example, the middle portion MA in the short-side length direction of the vibration apparatus 200 and the middle portion MA in the long-side length direction of the vibration apparatus 200 may have a same size as that of a pad region (or a pad arrangement region) 200*a* where the pad member 600 is disposed.

With reference to FIGS. 3 and 4, the vibration apparatus 200 may include a first region HA1 and a second region HA2 parallel to the long-side length direction thereof. The pad member 600 may be configured at each of the first region HA1 and the second region HA2 of the vibration apparatus 200.

In the vibration apparatus 200, the first region HA1 may be a region between the first center line CL1 and a first long side of the vibration apparatus 200. For example, the first region HA1 of the vibration apparatus 200 may be a first pad arrangement region, a first widthwise region, a first horizontal region, or an upper horizontal region. In the vibration apparatus 200, the second region HA2 may be a region between the first center line CL1 and a second long side of the vibration apparatus 200. The second region HA2 may be a second pad arrangement region, a second widthwise region, a second horizontal region, or a lower horizontal region. For example, the first region HA1 and the second region HA2 of the vibration apparatus 200 may be symmetric with respect to the first center line CL1, but embodiments of the present disclosure are not limited thereto.

The pad member 600 may include a first pad member 601 and a second pad member 602.

The first pad member 601 may be configured at the first region HA1. The second pad member 602 may be configured at the second region HA2. For example, each of the first pad member 601 and the second pad member 602 may include a shape which extends from the long-side length direction of the vibration apparatus 200. For example, each of the first pad member 601 and the second pad member 602 may include a line shape which extends from the long-side length direction of the vibration apparatus 200. For example, the first pad member 601 may include a shape which extends along the long-side length direction of the vibration apparatus 200 within the pad region 200*a* of the first region HA1. For example, the second pad member 602 may include a shape which extends along the long-side length direction of the vibration apparatus 200 within the pad region 200*a* of the second region HA2.

According to an embodiment of the present disclosure, each of the first pad member 601 and the second pad member 602 may be spaced apart from the first center line CL1 parallel to the long-side length direction of the vibration apparatus 200. For example, each of the first pad member 601 and the second pad member 602 may be spaced apart from the first center line CL1 of the short side of the vibration apparatus 200. The first center line CL1 may be a line between the first region HA1 and the second region HA2.

According to an embodiment of the present disclosure, the first pad member 601 and the second pad member 602 may be configured to be symmetric with respect to a center portion of the vibration apparatus 200. For example, the first pad member 601 and the second pad member 602 may be configured to be symmetric with respect to the first center line CL1 of the vibration apparatus 200.

According to an embodiment of the present disclosure, the pad member 600 is configured at the rear surface of the vibration apparatus 200, and thus, a resonance of the vibration apparatus 200 may be controlled, and a sound of the middle-high-pitched sound band may be enhanced.

Figure 5:
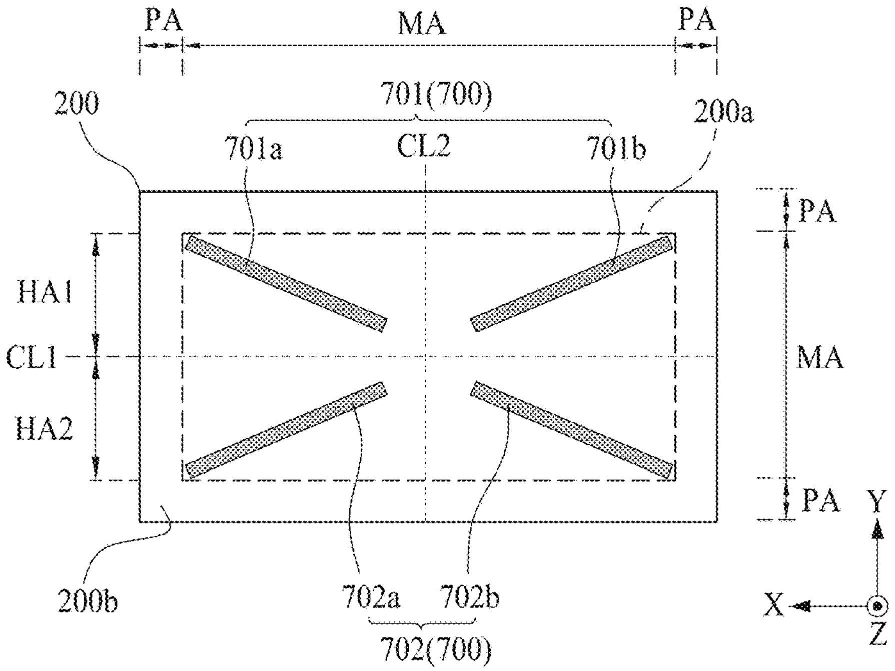
FIG. 5 illustrates an apparatus according to another embodiment of the present disclosure.

FIG. 5 illustrates an apparatus according to another embodiment of the present disclosure.

The apparatus according to another embodiment of the present disclosure may include the vibration apparatus 200 and the pad member 700.

The vibration apparatus 200 may include a long side and a short side. For example, the long side of the vibration apparatus 200 may be parallel to a long side of the vibration member 100. A center line of a short side of the vibration apparatus 200 may be a first center line CL1. A center line of a long side of the vibration apparatus 200 may be a second center line CL2. The first center line CL1 and the second center line CL2 may intersect or be orthogonal to a center portion (or a middle portion) of the vibration apparatus 200.

The pad member 700 may include a shape which is inclined from the long-side length direction of the vibration apparatus 200. For example, the pad member 700 may include a line shape which is inclined (or an inclined line shape or a slanted line shape) from the long-side length direction of the vibration apparatus 200. For example, the pad member 700 may include a shape which is inclined from a short-side length direction of the vibration apparatus 200. For example, the pad member 700 may include a line shape which is inclined (or an inclined line shape) from the short-side length direction of the vibration apparatus 200. For example, the pad member 700 may include a line shape or a diagonal shape which extends along a diagonal direction between the long-side length direction and the short-side length direction of the vibration apparatus 200.

In FIG. 5, a dotted line 200*a* may be a region where a vibration layer (211*a* of FIG. 10) is disposed, or may be a pad region (or a pad arrangement region) 200*a* where the pad member 700 is disposed. The pad member 700 may be disposed to overlap the vibration layer. For example, the pad region (or the pad arrangement region) 200*a* may have a size which is smaller than that of the vibration apparatus 200. For example, the pad region (or the pad arrangement region) 200*a* may have a size which is smaller than or equal to that of the region where the vibration layer (211*a* of FIG. 10) is disposed. The pad member 700 may be connected to or disposed at the rear surface of the vibration apparatus 200.

With reference to FIG. 5, the vibration apparatus 200 may include a middle portion MA and a periphery portion PA. A description of the middle portion MA and the periphery portion PA may be substantially a same as that of descriptions described above with reference to FIGS. 3 and 4, and thus, repeated descriptions may be omitted.

The pad member 700 may be disposed at the middle portion MA except the periphery portion PA of the vibration apparatus 200. For example, the pad member 700 may be disposed at the middle portion MA except the periphery portion PA in the long-side length direction of the vibration apparatus 200. For example, the pad member 700 may be disposed at the middle portion MA except the periphery portion PA in the short-side length direction of the vibration apparatus 200.

With reference to FIG. 5, the vibration apparatus 200 may include a first region HA1 and a second region HA2 parallel to the long-side length direction thereof. The pad member 700 may be configured at each of the first region HA1 and the second region HA2 of the vibration apparatus 200.

The pad member 700 may include a first pad member 701 and a second pad member 702. For example, the pad member 600 may include a plurality of first pad members 701 and a plurality of second pad members 702.

The first pad member 701 may be configured at the first region HA1. The first pad member 701 may include a 1-1th pad member 701*a* and a 1-2th pad member 701*b*. For example, the 1-1th pad member 701*a* and the 1-2th pad member 701*b* may be configured at the first region HA1. For example, the 1-1th pad member 701*a* and the 1-2th pad member 701*b* may be disposed at the middle portion MA except the periphery portion PA in the long-side length direction of the vibration apparatus 200.

The second pad member 702 may be configured at the second region HA2. The second pad member 702 may include a 2-1th pad member 702*a* and a 2-2th pad member 702*b*. For example, the 2-1th pad member 702*a* and the 2-2th pad member 702*b* may be disposed at the second region HA2. For example, the 2-1th pad member 702*a* and the 2-2th pad member 702*b* may be disposed at the middle portion MA except the periphery portion PA in the long-side length direction of the vibration apparatus 200.

According to an embodiment of the present disclosure, each of the first pad member 701 and the second pad member 702 may include a shape which is inclined from the long-side length direction of the vibration apparatus 200. For example, each of the first pad member 701 and the second pad member 702 may include a line shape which is inclined (or an inclined line shape or a slanted line shape) from the long-side length direction of the vibration apparatus 200. For example, each of the 2-1th pad member 702*a* and the 2-2th pad member 702*b* may include a shape which is inclined from the long-side length direction of the vibration apparatus 200. For example, each of the 2-1th pad member 702*a* and the 2-2th pad member 702*b* may include a line shape which is inclined (or an inclined line shape or a slanted line shape) from the long-side length direction of the vibration apparatus 200.

According to an embodiment of the present disclosure, each of the first pad member 701 and the second pad member 702 may include a line shape which extends along a diagonal direction between the long-side length direction and the short-side length direction of the vibration apparatus 200. For example, each of the 1-1*th* pad member 701*a* and the 1-2*th* pad member 701*b* may include a line shape which extends along a diagonal direction between the long-side length direction and the short-side length direction of the vibration apparatus 200. For example, each of the 2-1*th* pad member 702*a* and the 2-2*th* pad member 702*b* may include a line shape which extends along a diagonal direction between the long-side length direction and the short-side length direction of the vibration apparatus 200.

According to an embodiment of the present disclosure, each of the 1-1*th* pad member 701*a* and the 1-2*th* pad member 701*b* may include a line shape which extends along a diagonal direction in (or within) a pad region 200*a* of the first region HA1. For example, each of the 2-1*th* pad member 702*a* and the 2-2*th* pad member 702*b* may include a line shape which extends along a diagonal direction in (or within) a pad region 200*a* of the second region HA2.

According to an embodiment of the present disclosure, the first pad member 701 and the second pad member 702 may be configured to be symmetric with respect to a center portion of the vibration apparatus 200. For example, the first pad member 701 and the second pad member 702 may be configured to be symmetric with respect to the first center line CL1 of the vibration apparatus 200. The 1-1*th* pad member 701*a* and the 1-2*th* pad member 701*b* may be configured to be symmetric with respect to the center portion of the vibration apparatus 200. For example, the 1-1*th* pad member 701*a* and the 1-2*th* pad member 701*b* may be configured to be symmetric with respect to the first center line CL1 of the vibration apparatus 200. The 2-1*th* pad member 702*a* and the 2-2*th* pad member 702*b* may be configured to be symmetric with respect to the center portion of the vibration apparatus 200. For example, the 2-1*th* pad member 702*a* and the 2-2*th* pad member 702*b* may be configured to be symmetric with respect to the second center line CL2 of the vibration apparatus 200.

According to an embodiment of the present disclosure, one end (or one side or one portion) of each of the first pad member 701 and the second pad member 702 may be spaced apart from the center portion of the vibration apparatus 200. For example, one end (or one side or one portion) of each of the 1-1*th* pad member 701*a* and the 1-2*th* pad member 701*b* may be spaced apart from the center portion of the vibration apparatus 200. For example, one end (or one side or one portion) of each of the 2-1*th* pad member 702*a* and the 2-2*th* pad member 702*b* may be spaced apart from the center portion of the vibration apparatus 200.

According to an embodiment of the present disclosure, the pad member 700 may include a pair of first pad members 701*a* and 701*b* and a pair of second pad members 702*a* and 702*b*.

The pair of first pad members 701*a* and 701*b* may be disposed at the first region HA1. For example, the pair of first pad members 701*a* and 701*b* may be disposed at the middle portion MA except the periphery portion PA in the long-side length direction of the vibration apparatus 200.

The pair of second pad members 702*a* and 702*b* may be disposed at the second region HA2. For example, the pair of second pad members 702*a* and 702*b* may be disposed at the middle portion MA except the periphery portion PA in the long-side length direction of the vibration apparatus 200.

According to an embodiment of the present disclosure, each of the pair of first pad members 701*a* and 701*b* and the pair of second pad members 702*a* and 702*b* may include a shape which is inclined from the long-side length direction of the vibration apparatus 200. For example, each of the pair of first pad members 701*a* and 701*b* and the pair of second pad members 702*a* and 702*b* may include a line shape which is inclined (or an inclined line shape) from the long-side length direction of the vibration apparatus 200. For example, the pair of first pad members 701*a* and 701*b* may include a shape which is inclined from the long-side length direction of the vibration apparatus 200 in (or within) the pad region 200*a* of the first region HA1. For example, the pair of second pad members 702*a* and 702*b* may include a shape which is inclined from the long-side length direction of the vibration apparatus 200 in (or within) the pad region 200*a* of the second region HA2.

According to an embodiment of the present disclosure, the pair of first pad members 701*a* and 701*b* and the pair of second pad members 702*a* and 702*b* may include a line shape which extends along a diagonal direction between the long-side length direction and the short-side length direction of the vibration apparatus 200.

According to an embodiment of the present disclosure, the pair of first pad members 701*a* and 701*b* may be configured to be symmetric with respect to the center portion of the vibration apparatus 200. For example, the pair of first pad members 701*a* and 701*b* may be configured to be symmetric with respect to the second center line CL2 of the vibration apparatus 200. The pair of second pad members 702*a* and 702*b* may be configured to be symmetric with respect to the center portion of the vibration apparatus 200. For example, the pair of second pad members 702*a* and 702*b* may be configured to be symmetric with respect to the second center line CL2 of the vibration apparatus 200. The pair of first pad members 701*a* and 701*b* and the pair of second pad members 702*a* and 702*b* may be configured to be symmetric with respect to the center portion of the vibration apparatus 200. The pair of first pad members 701*a* and 701*b* and the pair of second pad members 702*a* and 702*b* may be configured to be symmetric with respect to the first center line CL1 of the vibration apparatus 200. For example, one end (or one side or one portion) of each of the pair of first pad members 701*a* and 701*b* and the pair of second pad members 702*a* and 702*b* may be spaced apart from the center portion of the vibration apparatus 200. For example, one end (or one side or one portion) of each of the pair of first pad members 701*a* and 701*b* and the pair of second pad members 702*a* and 702*b* may be spaced apart from an intersection point between the first center line CL1 and the second center line CL2 of the vibration apparatus 200.

According to an embodiment of the present disclosure, the pad member 700 is configured at the rear surface of the vibration apparatus 200, and thus, a resonance of the vibration apparatus 200 may be controlled, and a sound of the middle-high-pitched sound band may be enhanced.

Figure 6:
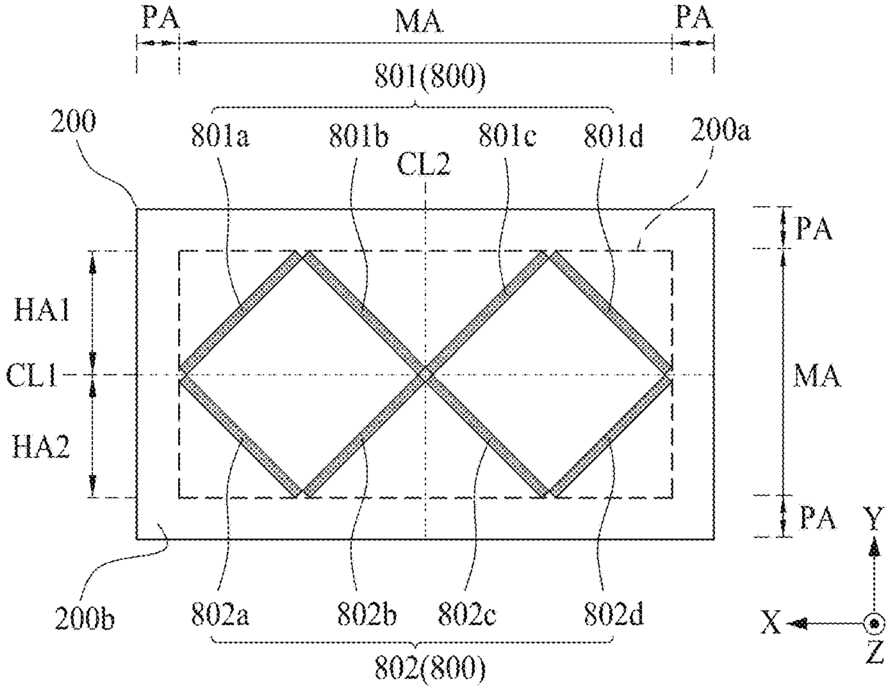
FIG. 6 illustrates an apparatus according to another embodiment of the present disclosure.

FIG. 6 illustrates an apparatus according to another embodiment of the present disclosure.

The apparatus according to another embodiment of the present disclosure may include the vibration apparatus 200 and the pad member 800.

The vibration apparatus 200 may include a long side and a short side. For example, the long side of the vibration apparatus 200 may be parallel to a long side of the vibration member 100. A center line of a short side of the vibration apparatus 200 may be a first center line CL1. A center line of a long side of the vibration apparatus 200 may be a second center line CL2. The first center line CL1 and the second center line CL2 may intersect or be orthogonal to a center portion (or a middle portion) of the vibration apparatus 200.

The pad member 800 may include a shape which is inclined from the long-side length direction of the vibration apparatus 200. For example, the pad member 800 may include a line shape which is inclined (or an inclined line shape) from the long-side length direction of the vibration apparatus 200. For example, the pad member 800 may include a shape which is inclined from a short-side length direction of the vibration apparatus 200. For example, the pad member 800 may include a line shape which is inclined (or an inclined line shape or a slanted line shape) from the short-side length direction of the vibration apparatus 200. For example, the pad member 800 may include a line shape or a diagonal shape which extends along a diagonal direction between the long-side length direction and the short-side length direction of the vibration apparatus 200.

In FIG. 6, a dotted line 200*a* may be a region where a vibration layer (211*a* of FIG. 10) is disposed, or may be a pad region (or a pad arrangement region) 200*a* where the pad member 800 is disposed. The pad member 800 may be disposed to overlap the vibration layer. For example, the pad region (or the pad arrangement region) 200*a* may have a size which is smaller than that of the vibration apparatus 200. For example, the pad region (or the pad arrangement region) 200*a* may have a size which is smaller than or equal to that of the region where the vibration layer (211*a* of FIG. 10) is disposed. The pad member 800 may be connected to or disposed at the rear surface of the vibration apparatus 200.

With reference to FIG. 6, the vibration apparatus 200 may include a middle portion MA and a periphery portion PA. A description of the middle portion MA and the periphery portion PA may be substantially a same as that of descriptions described above with reference to FIGS. 3 and 4, and thus, repeated descriptions may be omitted.

The pad member 800 may be disposed at the middle portion MA except the periphery portion PA of the vibration apparatus 200. For example, the pad member 800 may be disposed at the middle portion MA except the periphery portion PA in the long-side length direction of the vibration apparatus 200. For example, the pad member 800 may be disposed at the middle portion MA except the periphery portion PA in the short-side length direction of the vibration apparatus 200.

With reference to FIG. 6, the vibration apparatus 200 may include a first region HA1 and a second region HA2 parallel to the long-side length direction thereof. The pad member 700 may be configured at each of the first region HA1 and the second region HA2 of the vibration apparatus 200.

The pad member 800 may include a first pad member 801 and a second pad member 802. For example, the pad member 800 may include a plurality of first pad members 801 and a plurality of second pad members 802.

The first pad member 801 may be configured at the first region HA1. The plurality of first pad members 801 may include a 1-1$^{th}$ pad member 801*a*, a 1-2$^{th}$ pad member 801*b*, a 1-3$^{th}$ pad member 801*c*, and a 1-4$^{th}$ pad member 801*d*. For example, the 1-1$^{th}$ pad member 801$a$, the 1-2$^{th}$ pad member 801$b$, the 1-3$^{th}$ pad member 801$c$, and the 1-4$^{th}$ pad member 801$d$ may be configured at the first region HA1. For example, the 1-1$^{th}$ pad member 801$a$, the 1-2$^{th}$ pad member 801$b$, the 1-3$^{th}$ pad member 801$c$, and the 1-4$^{th}$ pad member 801$d$ may be disposed at the middle portion MA except the periphery portion PA in the long-side length direction of the vibration apparatus 200.

The second pad member 802 may be configured at the second region HA2. The plurality of second pad members 802 may include a 2-1$^{th}$ pad member 802$a$, a 2-2$^{th}$ pad member 802$b$, a 2-3$^{th}$ pad member 802$c$, and a 2-4$^{th}$ pad member 802$d$. For example, the 2-1$^{th}$ pad member 802$a$, the 2-2$^{th}$ pad member 802$b$, the 2-3$^{th}$ pad member 802$c$, and the 2-4$^{th}$ pad member 802$d$ may be configured at the second region HA2. For example, the 2-1$^{th}$ pad member 802$a$, the 2-2$^{th}$ pad member 802$b$, the 2-3$^{th}$ pad member 802$c$, and the 2-4$^{th}$ pad member 802$d$ may be disposed at the middle portion MA except the periphery portion PA in the long-side length direction of the vibration apparatus 200.

According to an embodiment of the present disclosure, each of the plurality of first pad members 801 and the plurality of second pad members 802 may include a shape which is inclined from the long-side length direction of the vibration apparatus 200. For example, each of the plurality of first pad members 801 and the plurality of second pad members 802 may include a line shape which is inclined (or an inclined line shape) from the long-side length direction of the vibration apparatus 200. For example, each of the 1-1$^{th}$ pad member 801$a$, the 1-2$^{th}$ pad member 801$b$, the 1-3$^{th}$ pad member 801$c$, and the 1-4$^{th}$ pad member 801$d$ may include a line shape which is inclined (or an inclined line shape or a slanted line shape) from the long-side length direction of the vibration apparatus 200. For example, each of the 2-1$^{th}$ pad member 802$a$, the 2-2$^{th}$ pad member 802$b$, the 2-3$^{th}$ pad member 802$c$, and the 2-4$^{th}$ pad member 802$d$ may include a line shape which is inclined (or an inclined line shape or a slanted line shape) from the long-side length direction of the vibration apparatus 200.

According to an embodiment of the present disclosure, each of the plurality of first pad members 801 and the plurality of second pad members 802 may include a line shape which extends along a diagonal direction between the long-side length direction and the short-side length direction of the vibration apparatus 200. For example, each of the 1-1$^{th}$ pad member 801$a$, the 1-2$^{th}$ pad member 801$b$, the 1-3$^{th}$ pad member 801$c$, and the 1-4$^{th}$ pad member 801$d$ may include a line shape which extends along a diagonal direction between the long-side length direction and the short-side length direction of the vibration apparatus 200. For example, each of the 2-1$^{th}$ pad member 802$a$, the 2-2$^{th}$ pad member 802$b$, the 2-3$^{th}$ pad member 802$c$, and the 2-4$^{th}$ pad member 802$d$ may include a line shape which extends along a diagonal direction between the long-side length direction and the short-side length direction of the vibration apparatus 200.

The 1-2$^{th}$ pad member 801$a$ and the 1-2$^{th}$ pad member 801$b$ may include a line shape where pad members are connected to each other. The 1-3$^{th}$ pad member 801$c$ and the 1-4$^{th}$ pad member 801$d$ may include a line shape where pad members are connected to each other. For example, the plurality of first pad members 801 may be disposed in an 'M'-shape or a vertically-reversed shape of a 'W'-shape.

The 2-1$^{th}$ pad member 802$a$ and the 2-2$^{th}$ pad member 802$b$ may include a line shape where pad members are connected to each other. The 2-3$^{th}$ pad member 802$c$ and the 2-4$^{th}$ pad member 802$d$ may include a line shape where pad members are connected to each other. For example, the plurality of second pad members 802 may be disposed in a 'W'-shape, a 'VV'-shape, or a vertically-reversed shape of an 'M'-shape.

According to an embodiment of the present disclosure, the plurality of first pad members 801 and the plurality of second pad members 802 may be configured to be symmetric with respect to the center portion of the vibration apparatus 200. For example, the plurality of first pad members 801 and the plurality of second pad members 802 may be configured to be symmetric with respect to the first center line CL1 of the vibration apparatus 200. The 1-1$^{th}$ pad member 801$a$ and the 1-2$^{th}$ pad member 801$b$ may be configured to be symmetric with the 1-3$^{th}$ pad member 801$c$ and the 1-4$^{th}$ pad member 801$d$ with respect to the center portion of the vibration apparatus 200. For example, the 1-1$^{th}$ pad member 801$a$, the 1-2$^{th}$ pad member 801$b$, the 1-3$^{th}$ pad member 801$c$, and the 1-4$^{th}$ pad member 801$d$ may be configured to be symmetric with respect to the second center line CL2 of the vibration apparatus 200. The 2-1$^{th}$ pad member 802$a$ and the 2-2$^{th}$ pad member 802$b$ may be configured to be symmetric with the 2-3$^{th}$ pad member 802$c$ and the 2-4$^{th}$ pad member 802$d$ with respect to the center portion of the vibration apparatus 200. For example, the 2-1$^{th}$ pad member 802$a$, the 2-2$^{th}$ pad member 802$b$, the 2-3$^{th}$ pad member 802$c$, and the 2-4$^{th}$ pad member 802$d$ may be configured to be symmetric with respect to the second center line CL2 of the vibration apparatus 200. The 1-1$^{th}$ pad member 801$a$, the 1-2$^{th}$ pad member 801$b$, the 1-3$^{th}$ pad member 801$c$, and the 1-4$^{th}$ pad member 801$d$ may be configured to be symmetric with the 2-1$^{th}$ pad member 802$a$, the 2-2$^{th}$ pad member 802$b$, the 2-3$^{th}$ pad member 802$c$, and the 2-4$^{th}$ pad member 802$d$ with respect to the center portion of the vibration apparatus 200. For example, the 1-1$^{th}$ pad member 801$a$, the 1-2$^{th}$ pad member 801$b$, the 1-3$^{th}$ pad member 801$c$, and the 1-4$^{th}$ pad member 801$d$ may be configured to be symmetric with the 2-1$^{th}$ pad member 802$a$, the 2-2$^{th}$ pad member 802$b$, the 2-3$^{th}$ pad member 802$c$, and the 2-4$^{th}$ pad member 802$d$ with respect to the first center line CL1 of the vibration apparatus 200.

According to an embodiment of the present disclosure, the pad member 800 is configured at the rear surface of the vibration apparatus 200, and thus, a resonance of the vibration apparatus 200 may be controlled, and a sound of the middle-high-pitched sound band may be enhanced.

Figure 7:
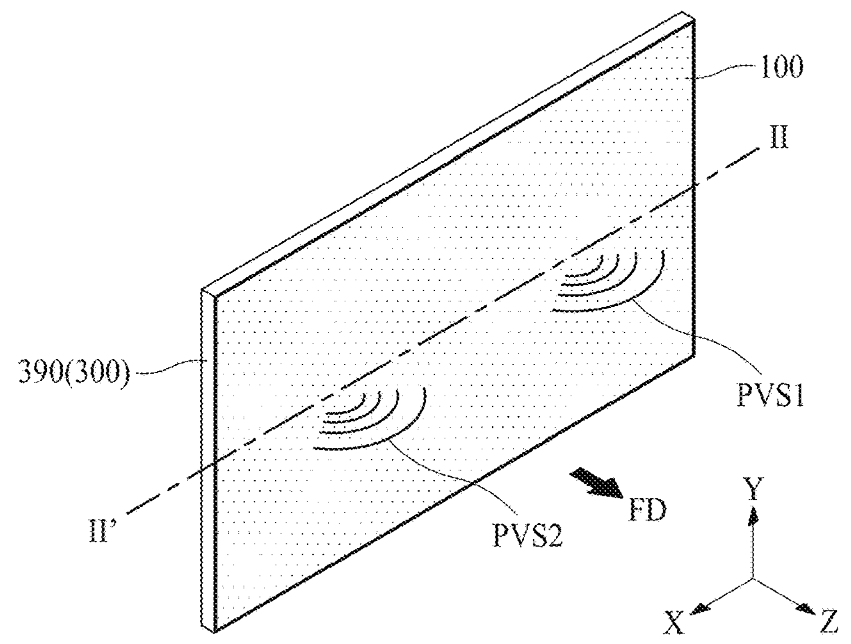
FIG. 7 illustrates an apparatus according to another embodiment of the present disclosure.
Figure 8:
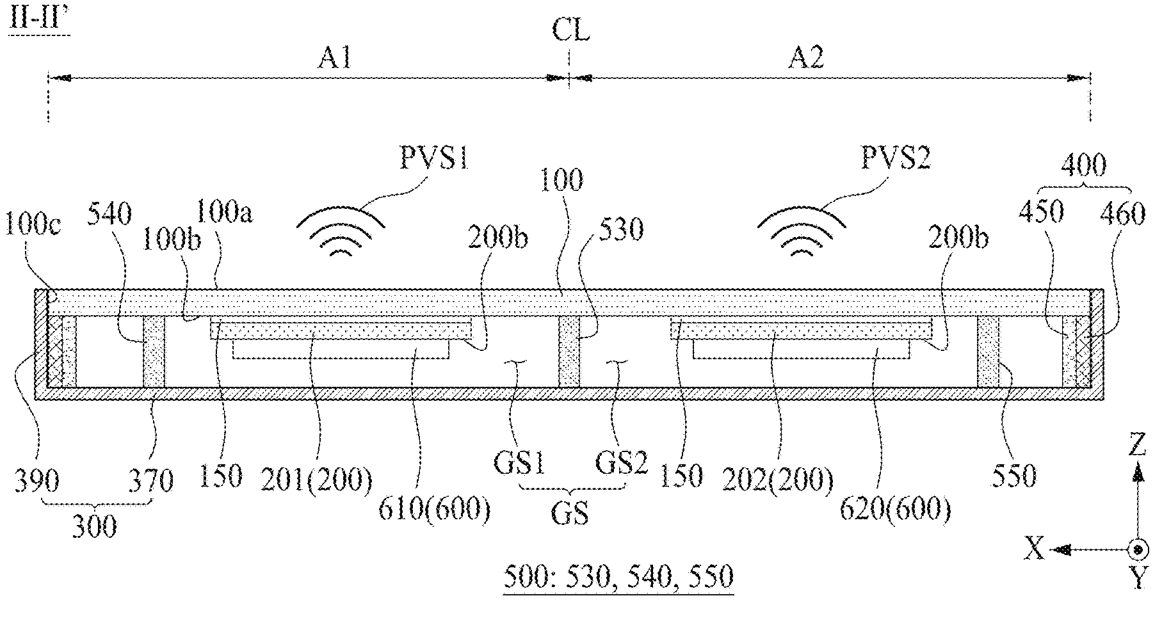
FIG. 8 is a cross-sectional view taken along line II-II' illustrated in FIG. 7 according to another embodiment of the present disclosure.

FIG. 7 illustrates an apparatus according to another embodiment of the present disclosure. FIG. 8 is a cross-sectional view taken along line II-II' illustrated in FIG. 7 according to another embodiment of the present disclosure.

With reference to FIGS. 7 and 8, the apparatus according to another embodiment of the present disclosure may include a vibration member 100, a supporting member 300, and a vibration apparatus 200. A description of the vibration member 100, the supporting member 300, and the vibration apparatus 200 may be substantially a same as that of descriptions described above with reference to FIGS. 1 and 2, and thus, like reference numerals refer to like elements and repeated descriptions may be omitted or will be briefly given below.

According to an embodiment of the present disclosure, the vibration member 100 may include a first surface 100$a$, a second surface 100$b$, and a plurality of lateral surfaces 100$c$.

In the vibration member 100, the first surface 100$a$ may be a front surface, a forward surface, a top surface, or an upper surface. The second surface 100$b$ may be a rear surface, a rearward surface, a backside surface, a bottom surface, or a lower surface. Each of the plurality of lateral surfaces 100*c* may be a side, an outer side, a sidewall, or an outer wall.

According to an embodiment of the present disclosure, each of the first surface 100*a* and the second surface 100*b* of the vibration member 100 may include a planar structure. The vibration member 100 may include a structure having a totally uniform thickness, but embodiments of the present disclosure are not limited thereto. For example, the vibration member 100 may include a plate structure having a totally uniform thickness, but embodiments of the present disclosure are not limited thereto.

According to an embodiment of the present disclosure, in the vibration member 100, each of the plurality of lateral surfaces 100*c* may include a vertical surface structure parallel to a third direction Z. The third direction Z may be a direction parallel to a thickness direction of the vibration member 100.

The vibration member 100 according to another embodiment of the present disclosure may include a vibration plate which includes a metal material or a nonmetal material (or a composite nonmetal material) having a material characteristic suitable for outputting a sound based on a vibration. The vibration member 100 may be configured to be transparent, translucent, or opaque. The metal material of the vibration member 100 may include any one or more materials of stainless steel, aluminum (Al), an Al alloy, a magnesium (Mg), a Mg alloy, and a magnesium-lithium (Mg—Li) alloy, but embodiments of the present disclosure are not limited thereto. The nonmetal material (or the composite nonmetal material) of the vibration member 100 may include one or more material (or substance) of plastic, fiber, leather, wood, cloth, rubber, carbon, glass, and paper, but embodiments of the present disclosure are not limited thereto. For example, the paper may be a cone paper for speakers. For example, the cone paper may be a pulp or a foamed plastic, or the like, but embodiments of the present disclosure are not limited thereto.

The vibration member 100 according to an embodiment of the present disclosure may implement or realize a signage panel such as an analog signage or a digital signage, or the like such as an advertising signboard, a poster, or a noticeboard, or the like. For example, when the vibration member 100 implements the signage panel, the analog signage may include signage content such as a sentence, a picture, and a sign, or the like. The signage content may be disposed at the vibration member 100 to be visible. For example, the signage content may be attached at one or more of the first surface 100*a* and the second surface 100*b* of the vibration member 100. For example, the signage content may be directly attached at one or more of the first surface 100*a* and the second surface 100*b* of the vibration member 100. For example, the signage content may be printed on a medium such as paper or the like, and the medium with the signage content printed thereon may be directly attached at one or more of the first surface 100*a* and the second surface 100*b* of the vibration member 100. For example, when the signage content is attached at the second surface 100*b* of the vibration member 100, the vibration member 100 may be configured as a transparent material.

The supporting member 300 may be configured or disposed at the second surface 100*b* of the vibration member 100. The supporting member 300 may be configured to cover or surround the second surface 100*b* and the lateral surfaces 100*c* of the vibration member 100.

The supporting member 300 according to an embodiment of the present disclosure may include an internal space 300*s* which covers the second surface 100*b* of the vibration member 100. For example, the supporting member 300 may include a box shape where one side (or an upper side or an upper portion) of the internal space 300*s* is opened. For example, the supporting member 300 may be a case, an outer case, a case member, a housing, a housing member, a cabinet, an enclosure, a sealing member, a scaling cap, a sealing box, or a sound box, or the like, but embodiments of the present disclosure are not limited thereto. For example, the internal space 300*s* of the supporting member 300 may be an accommodation space, a receiving space, a gap space, an air space, a vibration space, a sound space, a sound box, or a sealing space, or the like, but embodiments of the present disclosure are not limited thereto.

The supporting member 300 according to an embodiment of the present disclosure may include one or more of a metal material and a nonmetal material (or a composite nonmetal material), but embodiments of the present disclosure are not limited thereto. For example, the supporting member 300 may include one or more materials of a metal material, plastic, and wood, but embodiments of the present disclosure are not limited thereto. For example, the connector 400 may configure as a metal material such as aluminum (Al) or a plastic material such as plastic or styrene material, but embodiments of the present disclosure are not limited thereto. For example, the styrene material may be an ABS material. The ABS material may be acrylonitrile, butadiene, and styrene.

The supporting member 300 according to an embodiment of the present disclosure may include a first supporting part 370 and a second supporting part 390.

The first supporting g part 370 may be disposed in parallel with the vibration member 100. The first supporting part 370 may be disposed to face the second surface 100*b* of the vibration member 100. The first supporting part 370 may be disposed to cover the second surface 100*b* of the vibration member 100. The first supporting part 370 may be spaced apart from the second surface 100*b* of the vibration member 100. For example, the first supporting part 370 may be spaced apart from the second surface 100*b* of the vibration member 100 with the internal space 300*s* therebetween. For example, the first supporting part 370 may be a floor part, a floor plate, a bottom part, a bottom plate, a supporting plate, a housing plate, a housing bottom part, or a housing floor part, or the like, but embodiments of the present disclosure are not limited thereto.

The second supporting part 390 may be connected to a periphery portion of the first supporting part 370. For example, the second supporting part 390 may include a structure bent from the periphery portion of the first supporting part 370. For example, the second supporting part 390 may be parallel to the third direction Z, or may be inclined from the third direction Z. For example, the second supporting part 390 may be a lateral part, a sidewall, a supporting sidewall, a housing lateral surface, a housing sidewall, or the like, but embodiments of the present disclosure are not limited thereto.

The second supporting part 390 may be configured to cover or surround the lateral surfaces 100*c* of the vibration member 100. Accordingly, the second supporting part 390 may configure an outermost lateral surface of the apparatus or a lateral surface of a product.

The second supporting part 390 may be integrated into the first supporting part 370. For example, the first supporting part 370 and the second supporting part 390 may be integrated (or configured) as one body (or a single body), and thus, the internal space 300*s* surrounded by the second supporting part 390 may be provided over the first supporting part 370. Accordingly, the supporting member 300 may include a box shape where one side (or an upper side or an upper portion) is opened by the first supporting part 370 and the second supporting part 390.

The second supporting part 390 may have a single sidewall structure or a hemming structure. The hemming structure may be a structure where end portions of an arbitrary member are bent in a curve shape and overlap each other or are spaced apart from each other in parallel. For example, to enhance a sense of beauty in design, the second supporting part 390 may be configured to include a bending sidewall which is bent from the second supporting member 390. For example, the bending sidewall may include a first bending sidewall, bent from one side (or one portion or an end) of the second supporting member 390, and a second bending sidewall bent from the first bending sidewall to a region between the first bending sidewall and an outer surface of the vibration member 100. The second bending sidewall may be spaced apart from an inner surface of the first bending sidewall to prevent (or minimize) contact with the inner surface of the first bending sidewall or external impact in a lateral direction from being transmitted to the lateral surfaces 100*c* of the vibration member 100. Therefore, the second bending sidewall may prevent (or minimize) the lateral surfaces 100*c* of the vibration member 100 from contacting an inner surface of the first bending sidewall or may prevent a lateral direction external impact from being transferred to the lateral surfaces 100*c* of the vibration member 100.

The apparatus 10 according to an embodiment of the present disclosure may include a coupling member 400 between the vibration member 100 and the supporting member 300.

The supporting member 300 may be coupled or connected to the vibration member 100 by the coupling member 400. The supporting member 300 may be connected or coupled to a periphery portion of the vibration member 100 by the coupling member 400. The supporting member 300 may be connected or coupled to the second surface 100*b* of the vibration member 100 by the coupling member 400. The supporting member 300 may be connected or coupled to a periphery portion of the second surface 100*b* of the vibration member 100 by the coupling member 400.

The coupling member 400 may be configured to minimize or prevent the transfer of a vibration of the vibration member 100 to the supporting member 300. The coupling member 400 may include a material characteristic suitable for blocking the vibration transferred from the vibration member 100 to the supporting member 300. For example, the coupling member 400 may include a material having elasticity. For example, the coupling member 400 may include a material having elasticity for vibration absorption (or impact absorption). The coupling member 400 according to an embodiment of the present disclosure may be configured as polyurethane materials or polyolefin materials, but embodiments of the present disclosure are not limited thereto. For example, the coupling member 400 may include one or more of an adhesive, a double-sided tape, a double-sided foam tape, a double-sided foam pad, and a double-sided cushion tape, but embodiments of the present disclosure are not limited thereto.

The coupling member 400 according to an embodiment of the present disclosure may prevent a physical contact (or friction) between the vibration member 100 and the second supporting part 390 of the supporting member 300, and thus, may prevent the occurrence of noise (or a noise sound) caused by the physical contact (or friction) between the vibration member 100 and the supporting member 300. For example, the coupling member 400 may be a buffer member, an elastic member, a damping member, a vibration absorption member, a vibration prevention member, or a vibration blocking member, but embodiments of the present disclosure are not limited thereto.

The coupling member 400 according to another embodiment of the present disclosure may be configured to minimize or prevent the transfer of a vibration of the vibration member 100 to the supporting member 300 and to decrease the reflection of a sound wave which is generated and input based on a vibration of the vibration member 100.

The coupling member 400 according to another embodiment of the present disclosure may include a first coupling member 450 and a second coupling member 460.

The first coupling member 450 may be disposed between the vibration member 100 and the supporting member 300. The first coupling member 450 may be disposed or coupled between a rear periphery portion of the vibration member 100 and a first supporting part 370 of the supporting member 300. For example, the first coupling member 450 may be disposed inward (or an inner portion) of the second coupling member 460. The first coupling member 450 may be configured to have hardness which is smaller than that of the second coupling member 460, for example, a modulus (or a Young's modulus). For example, the first coupling member 450 may include a double-sided polyurethane tape, a double-sided polyurethane foam tape, a double-sided sponge tape, or the like, but embodiments of the present disclosure are not limited thereto.

The second coupling member 460 may be disposed between the vibration member 100 and the first supporting part 370 of the supporting member 300 to surround the first coupling member 450. The second coupling member 460 may be disposed or coupled between the rear periphery portion of the vibration member 100 and the first supporting part 370 of the supporting member 300 to surround the first coupling member 450. For example, the second coupling member 460 may be disposed outward (or an outer portion) from the first coupling member 450 and may be surrounded by the second supporting part 390 of the supporting member 300. The second coupling member 460 may be configured to have hardness which is greater than that of the first coupling member 450, for example, a modulus (or a Young's modulus). For example, the second coupling member 460 may include a double-sided polyolefin tape, a double-sided polyolefin foam tape, a double-sided acrylic tape, a double-sided acrylic foam tape, or the like, but embodiments of the present disclosure are not limited thereto.

The coupling member 400 according to another embodiment of the present disclosure may absorb a sound which is generated and input based on a vibration of the vibration member 100 by the first coupling member 450 which is relatively soft and is disposed inward from the second coupling member 460 which is relatively stiff (or harder), and thus, a reflected sound (or a reflected wave) generated by being reflected from the coupling member 400 may be minimized. Accordingly, each of a highest sound pressure level and a lowest sound pressure level generated in a reproduction frequency band of a sound generated based on a vibration of the vibration member 100 may be reduced, and thus, flatness of a sound pressure level may be enhanced.

The vibration apparatus 200 may be configured to vibrate the vibration member 100. The vibration apparatus 200 may vibrate the vibration member 100 to output a sound PVS1 and PVS2 or a first haptic feedback in a forward direction (or sound output direction) FD of the vibration member 100. The vibration apparatus 200 may be disposed or configured at the vibration member 100. The vibration apparatus 200 may be configured to vibrate (or displace or drive) based on a driving signal (or an electrical signal or a voice signal) applied thereto to vibrate (or displace) the vibration member 100. For example, the vibration apparatus 200 may be an active vibration member, a vibration generator, a vibration structure, a vibrator, a vibration generating device, a sound generator, a sound device, a sound element, a sound generating structure, or a sound generating device, but embodiments of the present disclosure are not limited thereto.

The vibration apparatus 200 according to an embodiment of the present disclosure may include a piezoelectric material or an electroactive material which have a piezoelectric characteristic. The vibration apparatus 200 may autonomously vibrate (or displace) based on a vibration (or displacement or driving) of the piezoelectric material based on a driving signal applied to the piezoelectric material, or may vibrate (or displace or drive) the vibration member 100 or the like. For example, the vibration apparatus 200 may alternately repeat contraction and/or expansion based on a piezoelectric effect (or a piezoelectric characteristic) to vibrate (or displace or drive). For example, the vibration apparatus 200 may vibrate (or displace or drive) in a vertical direction (or a thickness direction) Z as contraction and/or expansion are alternately repeated by an inverse piezoelectric effect.

The vibration apparatus 200 according to an embodiment of the present disclosure may include a rectangular shape which has a first length parallel to the first direction X and a second length parallel to the second direction Y. For example, the vibration apparatus 200 may include a rectangular shape which has where the first length is greater than that of the second length. For example, the vibration apparatus 200 may include a rectangular shape which has where the first length is twice (or two times) the second length, but embodiments of the present disclosure are not limited thereto.

The vibration apparatus 200 according to an embodiment of the present disclosure may be connected or coupled to the vibration member 100 by a connection member 150. For example, the vibration apparatus 200 may be connected to or supported by the second surface 100*b* of the vibration member 100 by the connection member 150, but embodiments of the present disclosure are not limited thereto. For example, the connection member 150 may be a first connection member, an adhesive member, or a first adhesive member, but embodiments of the present disclosure are not limited thereto.

The connection member 150 may be disposed between the vibration apparatus 200 and the vibration member 100 and may connect or couple the vibration apparatus 200 to the vibration member 100. For example, the vibration apparatus 200 may be connected or coupled to the second surface 100*b* of the vibration member 100 by the connection member 150, and thus, may be supported by or disposed at the second surface 100*b* of the vibration member 100.

The connection member 150 according to an embodiment of the present disclosure may include an adhesive layer (or a tacky layer) which is good in attaching force or adhesive force. For example, the connection member 150 may be configures as a material including an adhesive layer which is good in attaching force or adhesive force, with respect to each of the vibration apparatus 200 and the second surface 100*b* of the vibration member 100. For example, the connection member 150 may include a foam pad, a double-sided tape, a double-sided foam pad, a double-sided foam tape, an adhesive, a double-sided adhesive tape, a double-sided adhesive foam pad, a tacky sheet, or the like, but embodiments of the present disclosure are not limited thereto. For example, when the connection member 150 includes the adhesive layer (or the tacky layer), the connection member 150 may include only an adhesive layer or a tacky layer without a base member such as a plastic material or the like.

The adhesive layer (or a tacky layer) of the connection member 150 according to an embodiment of the present disclosure may include epoxy, acrylic, silicone, or urethane, but embodiments of the present disclosure are not limited thereto. The adhesive layer (or a tacky layer) of the connection member 150 according to another embodiment of the present disclosure may include a pressure sensitive adhesive (PSA), an optically cleared adhesive (OCA), or an optically cleared resin (OCR), but embodiments of the present disclosure are not limited thereto. For example, the adhesive layer of the connection member 150 may include an acrylic-based a substance (or a material) having a characteristic where an adhesive force is relatively better and hardness is higher than the urethane substance (or a material). Accordingly, a vibration of the vibration apparatus 200 may be efficiently transferred to the vibration member 100.

In the apparatus according to an embodiment of the present disclosure, the vibration member 100 may include a first region A1 and a second region A2. For example, the second surface 100*b* of the vibration member 100 may include a first region (or a first rear region) A1 and a second region (or a second rear region) A2. For example, the first region A1 may be a left rear region of the vibration member 100, and the second region A2 may be a right rear region of the vibration member 100. The first region A1 and the second region A2 may be a left-right symmetrical with respect to a center line CL of the vibration member 100 based on the first direction X, but embodiments of the present disclosure are not limited thereto. For example, the first region A1 and the second region A2 may be a left-right asymmetrical. For example, when the vibration member 100 is a display panel having a plurality of pixels, each of the first region A1 and the second region A2 may overlap a display area of the display panel.

The apparatus or the vibration apparatus 200 according to an embodiment of the present disclosure may include a first vibration apparatus 201 and a second vibration apparatus 202.

The vibration member 100 may include a long side and a short side. For example, the long side of each of the first vibration apparatus 201 and the second vibration apparatus 202 may be parallel to the long side of the vibration member 100.

The first vibration apparatus 201 may be configured or disposed at the first region A1 of the vibration member 100. The first vibration apparatus 201 may be connected or coupled to the first region A1 of the vibration member 100 by the connection member 150, and thus, may be connected to or supported by the first region A1 of the vibration member 100. The first vibration apparatus 201 may be connected to or supported by the second surface 100*b* of the vibration member 100 overlapping the first region A1 of the vibration member 100 by the connection member 150. For example, the first vibration apparatus 201 may be disposed close to a center or a periphery within the first region A1 of the vibration member 100 with respect to the first direction X. The first vibration apparatus 201 may vibrate the first region A1 of the vibration member 100, and thus, may generate a first sound PVS1 or a first haptic feedback in the first region A1 of the vibration member 100. For example, the first vibration apparatus 201 may directly vibrate the first region A1 of the vibration member 100, and thus, may generate the first sound PVS1 or the first haptic feedback in the first region A1 of the vibration member 100. For example, the first sound PVS1 may be a left sound (or a right sound).

The second vibration apparatus 202 may be configured or disposed at the second region A2 of the vibration member 100. The second vibration apparatus 202 may be connected or coupled to the second region A2 of the vibration member 100 by the connection member 150, and thus, may be connected to or supported by the second region A2 of the vibration member 100. The second vibration apparatus 202 may be connected to or supported by the second surface 100*b* of the vibration member 100 overlapping the second region A2 of the vibration member 100 by the connection member 150. For example, the second vibration apparatus 202 may be disposed close to a center or a periphery within the second region A2 of the vibration member 100 with respect to the first direction X. The second vibration apparatus 202 may vibrate the second region A2 of the vibration member 100, and thus, may generate a second sound PVS2 or a second haptic feedback in the second region A2 of the vibration member 100. For example, the second vibration apparatus 202 may directly vibrate the second region A2 of the vibration member 100, and thus, may generate the second sound PVS2 or the second haptic feedback in the second region A2 of the vibration member 100. For example, the second sound PVS2 may be a right sound (or a left sound).

The apparatus or the vibration apparatus 200 according to an embodiment of the present disclosure may further include a pad member 600.

The pad member 600 may be disposed at the rear surface 200*b* of the vibration apparatus 200. The pad member 600 may be connected to a rear surface of each of the first vibration apparatus 201 and the second vibration apparatus 202. The pad member 600 may include a first pad member 610 and a second pad member 620. The first pad member 610 may be disposed at the rear surface of the first vibration apparatus 201. The first pad member 610 may support the first vibration apparatus 201. For example, the second pad member 620 may be disposed at the rear surface of the second vibration apparatus 202. The second pad member 620 may support the second vibration apparatus 202. For example, the vibration apparatus 200 may be disposed between the vibration member 100 and the pad member 600. For example, the first vibration apparatus 201 may be disposed between the vibration member 100 and the first pad member 610. For example, the second vibration apparatus 202 may be disposed between the vibration member 100 and the second pad member 610.

The apparatus or the vibration apparatus 200 according to an embodiment of the present disclosure may further include a partition 500.

The partition 500 may be configured to surround the vibration apparatus 200. The partition 500 may be configured between the vibration member 100 and the supporting member 300. The partition 500 may be configured between the vibration member 100 and the supporting member 300 to surround the vibration apparatus 200. The partition 500 may be spaced apart from the coupling member 400 and may be surrounded by the coupling member 400. Therefore, the apparatus according to an embodiment of the present disclosure may further include a gap space configured between the vibration member 100, the supporting member 300, and the partition 500. The vibration apparatus 200 may be disposed at the gap space, and in a same plane, a center portion of the vibration apparatus 200 may be spaced apart from a center portion of the gap space.

The partition 500 may be configured between the vibration member 100 and the supporting member 300 to surround each of the first vibration apparatus 201 and the second vibration apparatus 202. The partition 500 may define or limit a vibration region of the first region A1 of the vibration member 100 by the first vibration apparatus 201 and may define or limit a vibration region of the second region A2 of the vibration member 100 by the second vibration apparatus 202.

The partition 500 may form the gap space GS. For example, the gap space GS may include a first gap space GS1 and a second gap space GS2. For example, the partition 500 may form a first gap space GS1 at a periphery of the first vibration apparatus 201 and a second gap space GS2 at a periphery of the second vibration apparatus 202. For example, the partition 500 may be referred to as a sound blocking member, a sound separation member, a space separation member, an enclosure, a baffle, or the like, but embodiments of the present disclosure are not limited thereto.

The partition 500 according to an embodiment of the present disclosure may separate a vibration (or a sound), generated at the first region A1 of the vibration member 100, from a vibration (or a sound) generated at the second region A2 of the vibration member 100, or may minimize or prevent mutual interference. A left sound and a right sound generated based on vibrations of the first region A1 and the second region A2 of the vibration member 100 may be separated from each other by the partition 500, and thus, a sound output characteristic of the apparatus may be further enhanced and the sounds PVS1 and PVS2 including a 2-channel sound based on the separation of the left and right sounds may be output in the forward direction FD of the vibration member 100.

According to an embodiment of the present disclosure, the partition 500 may configured with a material having elasticity which enables a certain degree of compression. For example, the partition 500 may be configured with polyurethane or polyolefin, but embodiments of the present disclosure are not limited thereto. As another embodiment of the present disclosure, the partition 500 may be configured as a single-sided tape, a single-sided foam tape, a single-sided foam pad, a double-sided tape, a double-sided foam tape, a double-sided foam pad, or the like, but embodiments of the present disclosure are not limited thereto.

Therefore, the apparatus 10 according to an embodiment of the present disclosure may output the sounds PVS1 and PVS2, where a sound characteristic and/or a sound pressure level characteristic may be enhanced, and may output sounds which includes left sound PVS1 and right sound PVS2 including the form of a 2-channel in the forward direction FD of the vibration member 100.

Figure 9:
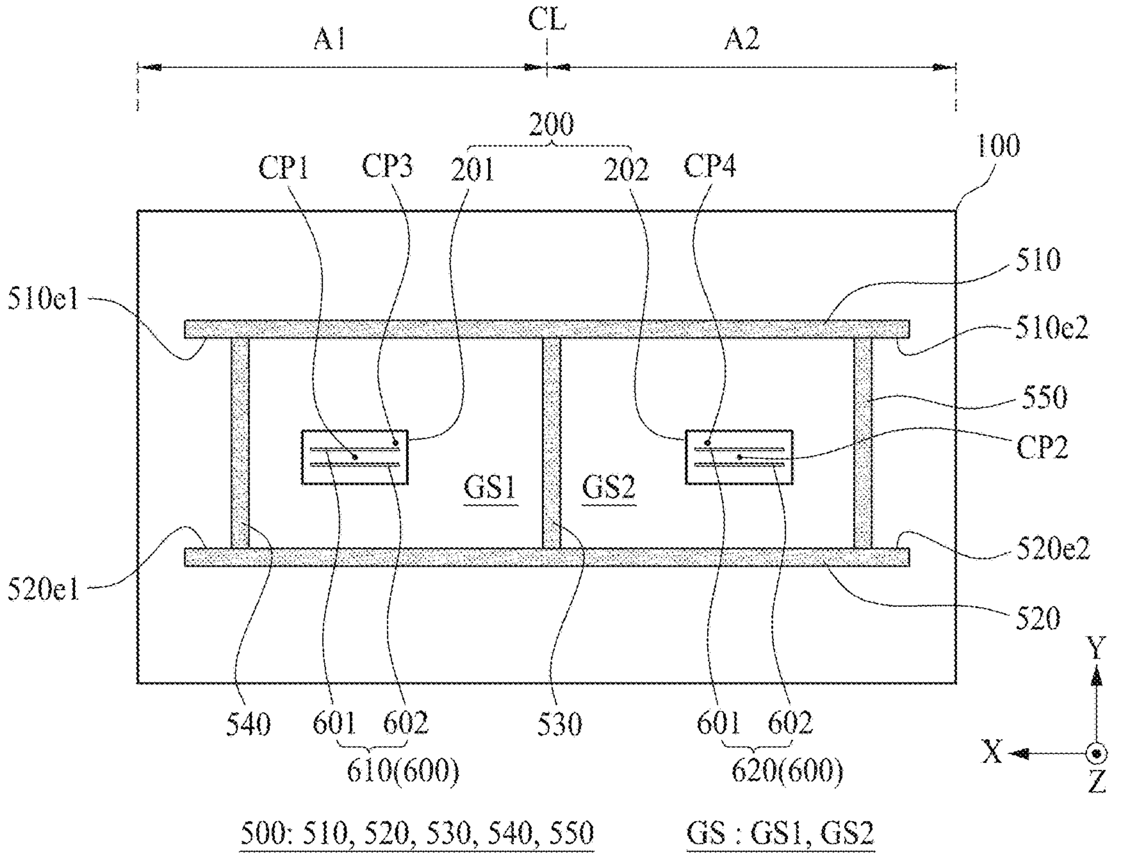
FIG. 9 illustrates a rear surface of a vibration member, a vibration apparatus, and a partition illustrated in FIG. 8 according to another embodiment of the present disclosure.

FIG. 9 illustrates a rear surface of a vibration member, a vibration apparatus, and a partition illustrated in FIG. 8 according to another embodiment of the present disclosure.

With reference to FIGS. 8 and 9, a partition 500 according to an embodiment of the present disclosure may include first to fifth partition members 510 to 550.

The first and second partition members 510 and 520 may be disposed in parallel with the vibration apparatus 200 therebetween. The first and second partition members 510 and 520 may be disposed in parallel with the first vibration apparatus 201 and the second vibration apparatus 202 of the vibration apparatus 200 therebetween. Each of the first and second partition members 510 and 520 may be disposed in parallel with a first direction X.

The third partition member 530 may be disposed between the first partition member 510 and the second partition member 520 and may be disposed between the first vibration apparatus 201 and the second vibration apparatus 202. The third partition member 530 may be disposed in parallel with a second direction Y. The third partition member 530 may be disposed at a region CL between the first region A1 and the second region A2 of the vibration member 100.

The fourth partition member 540 may be disposed between the first partition member 510 and the second partition member 520 and may be disposed between the first vibration apparatus 201 and a coupling member 400. The fourth partition member 540 may be disposed in parallel with the third partition member 530 with the first vibration apparatus 201 therebetween. The fourth partition member 540 may be disposed closer to the first vibration apparatus 201 than the coupling member 400.

The fifth partition member 550 may be disposed between the first partition member 510 and the second partition member 520 and may be disposed between the second vibration apparatus 202 and the coupling member 400. The fifth partition member 550 may be disposed in parallel with the third partition member 530 with the second vibration apparatus 202 therebetween. The fifth partition member 550 may be disposed closer to the second vibration apparatus 202 than the coupling member 400.

Each of a first end portion (or one side or one portion) 510*e*1 of the first partition member 510 and a first end portion (or one side or one portion) 520*e*1 of the second partition member 520 may protrude toward a lateral surface of the vibration member 100 from the fourth partition member 540. Each of the first end portion 510*e*1 of the first partition member 510 and the first end portion 520*e*1 of the second partition member 520 may protrude toward the coupling member 400 from the fourth partition member 540. Each of the first end portion 510*e*1 of the first partition member 510 and the first end portion 520*e*1 of the second partition member 520 may be disposed between the fourth partition member 540 and the coupling member 400. Each of the first end portion 510*e*1 of the first partition member 510 and the first end portion 520*e*1 of the second partition member 520 may trap a reflected wave which occurs due to the coupling member 400 when the vibration member 100 is vibrating, and thus, a reduction in sound pressure level characteristic caused by a standing wave occurring due to a reflected wave and a progressive wave may be prevented or minimized.

Each of a second end portion (or other side) 510*e*2 of the first partition member 510 and a second end portion (or other side) 510*e*2 of the second partition member 520 may protrude toward the coupling member 400 from the fifth partition member 550. Each of the second end portion 510*c*2 of the first partition member 510 and the second end portion 520*e*2 of the second partition member 520 may be disposed between the fifth partition member 550 and the coupling member 400. Each of the second end portion 510*e*2 of the first partition member 510 and the second end portion 520*c*2 of the second partition member 520 may trap a reflected wave which occurs due to the coupling member 400 when the vibration member 100 is vibrating, and thus, a reduction in sound pressure level characteristic caused by a standing wave occurring due to a reflected wave and a progressive wave may be prevented or minimized.

The first to fourth partition members 510 to 540 may provide a gap space GS. The gap space GS may include a first gap space GS1 and a second gap space GS2. The first to fourth partition members 510 to 540 may provide the first gap space GS1. For example, the first gap space GS1 may be a space surrounded by the first to fourth partition members 510 to 540. The first to third partition members 510 to 530 and the fifth partition member 550 may provide the second gap space GS2. The second gap space GS2 may be a space surrounded by the first to third partition members 510 to 530 and the fifth partition member 550.

The first vibration apparatus 201 may be disposed at the first gap space GS1. A center portion CP1 of the first vibration apparatus 201 may be spaced apart from a center portion CP3 of the first gap space GS1. For example, to minimize vibration interference between the first region A1 and the second region A2 of the vibration member 100, the center portion CP1 of the first vibration apparatus 201 may be spaced apart from the center portion CP3 of the first gap space GS1. For example, the center portion CP1 of the first vibration apparatus 201 may be disposed between the center portion CP3 of the first gap space GS1 and the fourth partition member 540.

According to an embodiment of the present disclosure, each of the first pad member 601 and the second pad member 602 at the rear surface of the first vibration apparatus 201 may be disposed closer to the center portion CP1 than the long side of the first vibration apparatus 201 or the vibration apparatus 200. For example, the first pad member 601 and the second pad member 602 may be configured to be symmetric with respect to the center portion CP1 of the first vibration apparatus 201. For example, one end (or one side or one portion) of each of the first pad member 601 and the second pad member 602 may be spaced apart from the center portion CP1 of the first vibration apparatus 201.

The second vibration apparatus 202 may be disposed at the second gap space GS2. A center portion CP2 of the second vibration apparatus 202 may be spaced apart from a center portion CP4 of the second gap space GS2. For example, to minimize vibration interference between the first region A1 and the second region A2 of the vibration member 100, the center portion CP3 of the second vibration apparatus 202 may be spaced apart from the center portion CP4 of the second gap space GS2. For example, the center portion CP2 of the second vibration apparatus 202 may be disposed between the center portion CP4 of the second gap space GS2 and the fifth partition member 550.

According to an embodiment of the present disclosure, each of the first pad member 601 and the second pad member 602 at the rear surface of the second vibration apparatus 202 may be disposed closer to the center portion CP2 than the long side of the second vibration apparatus 202 or the vibration apparatus 200. For example, the first pad member 601 and the second pad member 602 may be configured to be symmetric with respect to the center portion CP2 of the second vibration apparatus 202. For example, one end (or one side or one portion) of each of the first pad member 601 and the second pad member 602 may be spaced apart from the center portion CP2 of the second vibration apparatus 202.

The pad member 600 described above with reference to FIG. 9 may be changed to the pad member 700 described above with reference to FIG. 5 or may be changed to the pad member 800 described above with reference to FIG. 6, and thus, repeated descriptions may be omitted.

Figure 10:
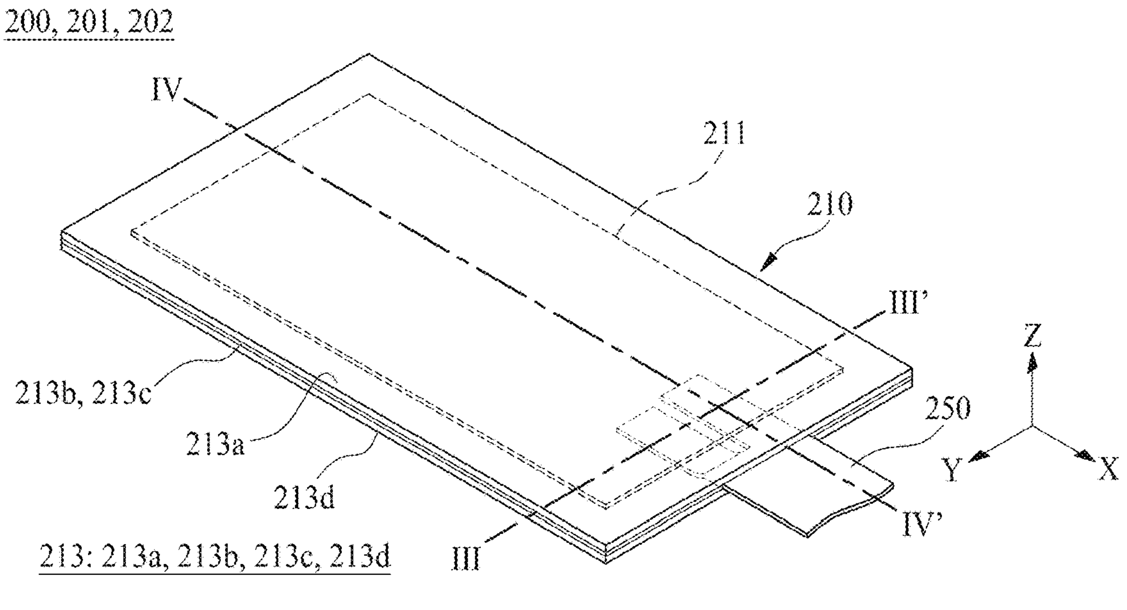
FIG. 10 illustrates a vibration apparatus according to an embodiment of the present disclosure.
Figure 11:
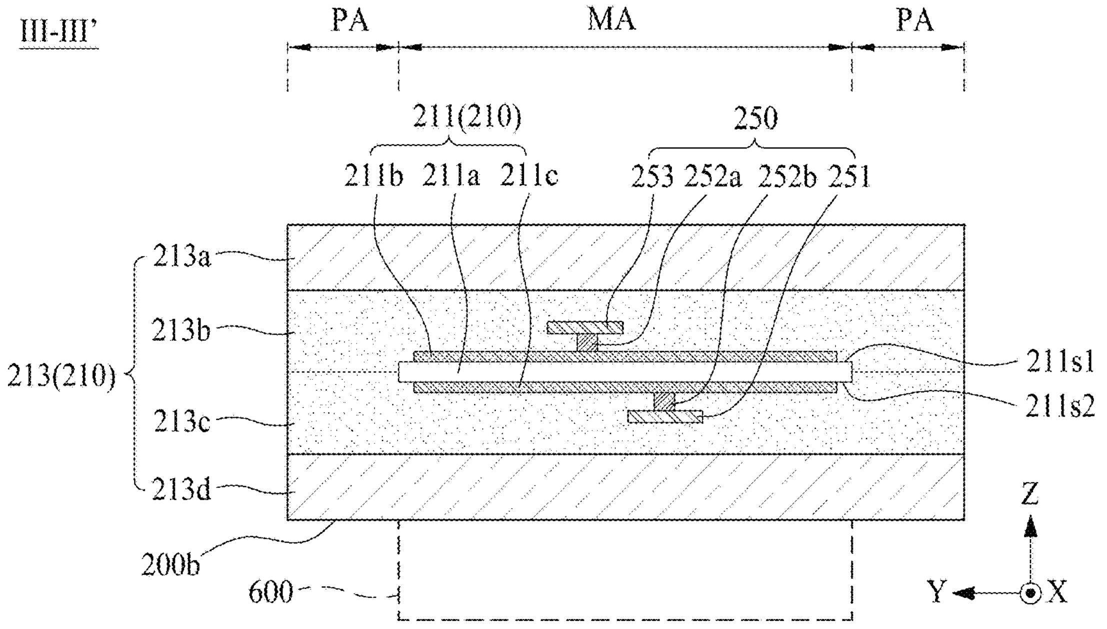
FIG. 11 is a cross-sectional view taken along line III-III' illustrated in FIG. 10 according to an embodiment of the present disclosure.
Figure 12:
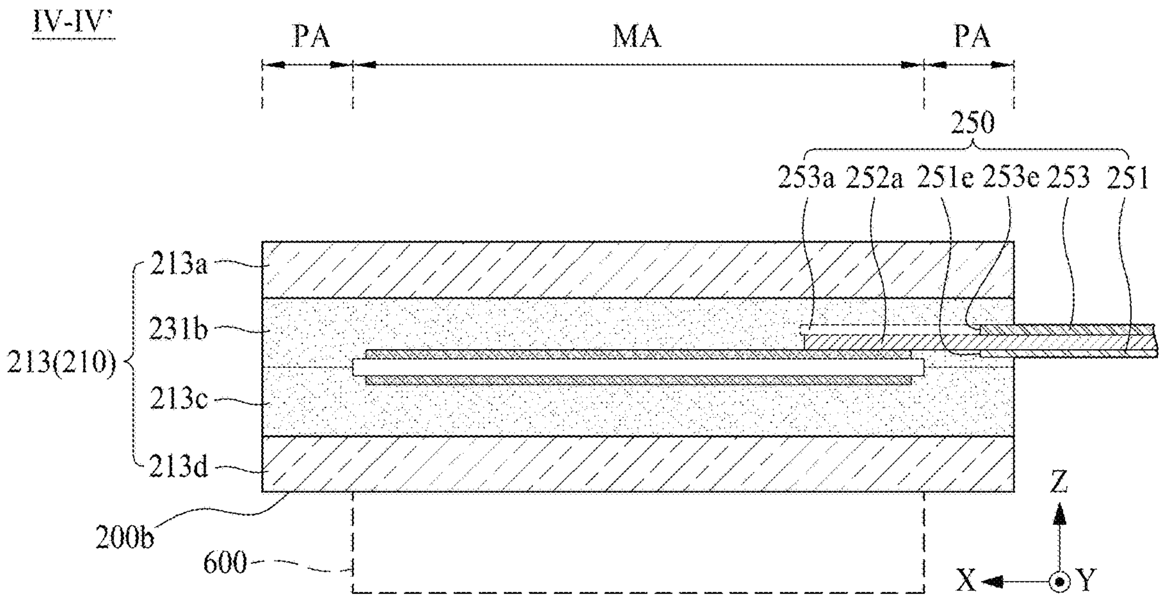
FIG. 12 is a cross-sectional view taken along line IV-IV' illustrated in FIG. 10 according to an embodiment of the present disclosure.

FIG. 10 illustrates a vibration apparatus according to an embodiment of the present disclosure. FIG. 11 is a cross-sectional view taken along line III-III' illustrated in FIG. 10 according to an embodiment of the present disclosure. FIG. 12 is a cross-sectional view taken along line IV-IV' illustrated in FIG. 10 according to an embodiment of the present disclosure. FIGS. 10 to 11 illustrate a vibration apparatus described above with reference to FIGS. 1 to 9.

With reference to FIGS. 10 to 12, the vibration apparatus 200 according to an embodiment of the present disclosure may include a piezoelectric material having a piezoelectric characteristic. The vibration apparatus 200 may be configured as a ceramic-based piezoelectric material for implementing a relatively strong vibration, or may be configured as a piezoelectric ceramic having a perovskite-based crystal structure.

The vibration apparatus 200 according to an embodiment of the present disclosure may include a vibration generating part 210. The vibration apparatus 200 or the vibration generating part 210 according to an embodiment of the present disclosure may include a vibration part 211. The vibration apparatus 200 may include a first vibration apparatus 201 and a second vibration apparatus 202. Each of the first vibration apparatus 201 and second vibration apparatus 202 may include a vibration part 211.

The vibration part 211 may be configured to vibrate by a piezoelectric effect based on a driving signal. The vibration part 211 may include at least one or more of a piezoelectric inorganic material and a piezoelectric organic material. For example, the vibration part 211 may be a vibration device, a piezoelectric device, a piezoelectric device part, a piezoelectric device layer, a piezoelectric structure, a piezoelectric vibration part, or a piezoelectric vibration layer, or the like, but embodiments of the present disclosure are not limited thereto.

The vibration part 211 according to an embodiment of the present disclosure may include a vibration layer 211*a*, a first electrode layer 211*b*, and a second electrode layer 211*c*.

The vibration layer 211*a* may include a piezoelectric material or an electroactive material which includes a piezoelectric effect. For example, the piezoelectric material may have a characteristic in which, when pressure or twisting phenomenon is applied to a crystalline structure by an external force, a potential difference occurs due to dielectric polarization caused by a relative position change of a positive (+) ion and a negative (−) ion, and a vibration is generated by an electric field based on a reverse voltage applied thereto. For example, the vibration layer 211*a* may be a piezoelectric layer, a piezoelectric material layer, an electroactive layer, a piezoelectric composite layer, a piezoelectric composite, or a piezoelectric ceramic composite, or the like, but embodiments of the present disclosure are not limited thereto. For example, the vibration layer 211*a* may be disposed at a portion indicated by the dotted line described above with reference to FIGS. 3 to 6.

The vibration layer 211*a* may be configured as a ceramic-based material for implementing a relatively strong vibration, or may be configured as a piezoelectric ceramic having a perovskite-based crystalline structure. The perovskite crystalline structure may have a piezoelectric effect and/or an inverse piezoelectric effect and may be a plate-shaped structure having orientation.

The piezoelectric ceramic may be configured as a single crystalline ceramic having a single crystalline structure, or may be configured as a ceramic material or polycrystalline ceramic having a polycrystalline structure. A piezoelectric material including the single crystalline ceramic may include α-$AlPO_4$, α-$SiO_2$, $LiNbO_3$, $Tb_2(MoO_4)_3$, $Li_2B_4O_7$, or ZnO, but embodiments of the present disclosure are not limited thereto. A piezoelectric material including the polycrystalline ceramic may include a lead zirconate titanate (PZT)-based material, including lead (Pb), zirconium (Zr), and titanium (Ti), or may include a lead zirconate nickel niobate (PZNN)-based material, including lead (Pb), zirconium (Zr), nickel (Ni), and niobium (Nb), but embodiments of the present disclosure are not limited thereto. For example, the vibration layer 211*a* may include at least one or more of calcium titanate ($CaTiO_3$), barium titanate ($BaTiO_3$), and strontium titanate ($SrTiO_3$), without lead (Pb), but embodiments of the present disclosure are not limited thereto.

The first electrode layer 211*b* may be disposed at a first surface (or an upper surface or a front surface) 211*s*1 of the vibration layer 211*a*. The first electrode layer 211*b* may have a same size as that of the vibration layer 211*a*, or may have a size which is smaller than that of the vibration layer 211*a*.

The second electrode layer 211*c* may be disposed at a second surface (or a lower surface or a rear surface) 211*s*2 which is opposite to or different from the first surface 211*s*1 of the vibration layer 211*a*. The second electrode layer 211*c* may have a same size as that of the vibration layer 211*a*, or may have a size which is smaller than that of the vibration layer 211*a*. For example, the second electrode layer 211*c* may have a same shape as that of the vibration layer 211*a*, but embodiments of the present disclosure are not limited thereto.

According to an embodiment of the present disclosure, in order to prevent electrical short circuit between the first electrode layer 211*b* and the second electrode layer 211*c*, each of the first electrode layer 211*b* and the second electrode layer 211*c* may be formed at the other portion, except a periphery portion, of the vibration layer 211*a*. For example, the first electrode layer 211*b* may be formed at an entire first surface 211*s*1, other than a periphery portion, of the vibration layer 211*a*. For example, the second electrode layer 211*c* may be formed at an entire second surface 211*s*2, other than a periphery portion, of the vibration layer 211*a*. For example, a distance between a lateral surface (or a sidewall) of each of the first electrode layer 211*b* and the second electrode layer 211*c* and a lateral surface (or a sidewall) of the vibration layer 211*a* may be at least 0.5 mm or more. For example, the distance between the lateral surface of each of the first electrode layer 211*b* and the second electrode layer 211*c* and the lateral surface of the vibration layer 211*a* may be at least 1 mm or more, but embodiments of the present disclosure are not limited thereto.

According to an embodiment of the present disclosure, one or more of the first electrode layer 211*b* and the second electrode layer 211*c* may be formed of a transparent conductive material, a semitransparent conductive material, or an opaque conductive material. For example, the transparent conductive material or the semitransparent conductive material may include indium tin oxide (ITO) or indium zinc oxide (IZO), but embodiments of the present disclosure are not limited thereto. The opaque conductive material may include gold (Au), silver (Ag), platinum (Pt), palladium (Pd), molybdenum (Mo), magnesium (Mg), carbon, or silver (Ag) including glass frit, or the like, or may be made of an alloy thereof, but embodiments of the present disclosure are not limited thereto. For example, in order to enhance an electrical characteristic and/or a vibration characteristic of the vibration layer 211*a*, each of the first electrode layer 211*b* and the second electrode layer 211*c* may include silver (Ag) having a low resistivity. For example, carbon may be carbon black, ketjen black, carbon nanotube, and a carbon material including graphite, but embodiments of the present disclosure are not limited thereto.

The vibration layer 211*a* may be polarized (or poling) by a certain voltage applied to the first electrode layer 211*b* and the second electrode layer 211*c* in a certain temperature atmosphere, or a temperature atmosphere that may be changed from a high temperature to a room temperature, but embodiments of the present disclosure are not limited thereto. For example, a polarization direction (or a poling direction) formed in the vibration layer 211*a* may be formed or aligned (or arranged) from the first electrode layer 211*b* to the second electrode layer 211*c*, but is not limited thereto, and a polarization direction (or a poling direction) formed in the vibration layer 211*a* may be formed or aligned (or arranged) from the second electrode layer 211*c* to the first electrode layer 211*b*.

The vibration layer 211*a* may alternately and repeatedly contract and/or expand based on an inverse piezoelectric effect according to a driving signal applied to the first electrode layer 211*b* and the second electrode layer 211*c* from the outside to vibrate. For example, the vibration layer 211*a* may vibrate in a vertical direction (or thickness direction) and in a planar direction by the signal applied to the first electrode layer 211*b* and the second electrode layer 211*c*. The vibration layer 211*a* may be displaced (or vibrated or driven) by contraction and/or expansion of the planar direction, thereby improving a sound characteristic and/or a sound pressure level characteristic of the vibration part 211.

The vibration apparatus 200 according to an embodiment of the present disclosure may further include a cover member 213.

The cover member 213 may be configured to cover at least one or more of a first surface and a second surface of the vibration part 211. The second surface of the vibration part 211 may be different from or opposite to the first surface of the vibration part 211. The cover member 213 may be configured to protect at least one or more of the first surface and the second surface of the vibration part 211. For example, the first surface of the vibration part 211 may be a front surface or an upper surface. For example, the second surface of the vibration part 211 may be a rear surface, a back surface, or a lower surface which are opposite to the first surface.

The vibration apparatus 200 according to an embodiment of the present disclosure may further include a first cover member 213*a*.

The first cover member 213*a* may be disposed at the first surface of the vibration part 211. For example, the first cover member 213*a* may be configured to cover the first electrode layer 211*b* of the vibration part 211. For example, the first cover member 213*a* may be configured to have a larger size than the vibration part 211. The first cover member 213*a* may be configured to protect the first surface of the vibration part 211 and the first electrode layer 211*b*.

The first cover member 213*a* according to an embodiment of the present disclosure may include an adhesive layer. For example, the first cover member 213*a* may include a base film, and an adhesive layer which is in the base film and is connected or coupled to the first surface of the vibration part 211. For example, the adhesive layer may include an electrical insulating material which has adhesive properties and is capable of compression and decompression.

The first cover member 213*a* according to another embodiment of the present disclosure may be connected or coupled to the first surface of the vibration part 211 by a first adhesive layer 213*b*. For example, the first cover member 213*a* may be connected or coupled to the first surface or the first electrode layer 211*b* of the vibration part 211 by the first adhesive layer 213*b*. For example, the first cover member 213*a* may be connected or coupled to the first surface or the first electrode layer 211*b* of the vibration part 211 by a film laminating process by using the first adhesive layer 213*b*. The first adhesive layer 213*b* may be configured to surround an entire first surface or a portion of a lateral surface of the vibration part 211.

The cover member 213 according to an embodiment of the present disclosure may include a second adhesive layer 213*c*.

The second adhesive layer 213*c* may be disposed at the second surface of the vibration part 211. The second adhesive layer 213*c* may be configured to cover the second electrode layer 211*c* of the vibration part 211. The second adhesive layer 213*c* may be configured to protect the second surface and the second electrode layer 211*c* of the vibration part 211. The second adhesive layer 213*c* may be configured to surround an entire second surface or a portion of a lateral surface of the vibration part 211. For example, the second adhesive layer 213*c* may be a protection layer or a protection member.

The second adhesive layer 213*c* may be connected or coupled to the first adhesive layer 213*b* in a lateral surface of the vibration part 211 or a periphery portion of the first cover member 213*a*. Thus, the first adhesive layer 213*b* and the second adhesive layer 213*c* may be configured to surround or completely surround the vibration part 211. The first adhesive layer 213*b* and the second adhesive layer 213*c* may be configured to cover or surround all surfaces of the vibration part 211. For example, the vibration part 211 may be inserted (or accommodated) or embedded (or built-in) at an inner portion of the adhesive layer including the first adhesive layer 213*b* and the second adhesive layer 213*c*.

The cover member 213 may be connected or coupled to the vibration member 100 the connection member 400 illustrated in FIGS. 2 to 12. For example, any one of the first cover member 213*a* and the second adhesive layer 213*c* may be connected or coupled to the vibration member 100 the connection member 400 illustrated in FIGS. 2 to 12.

The cover member 213 according to an embodiment of the present disclosure may further include a second cover member 213*d*, but embodiments of the present disclosure are not limited thereto. The second cover member 213*d* may be disposed at the second surface of the vibration part 211. For example, the second cover member 213*d* may be configured to cover the second electrode layer 211*c* of the vibration part 211. For example, the second cover member 213*d* may be configured to have a larger size than the vibration part 211 and may be configured to have a same size as the vibration part 211. The second cover member 213*d* may be configured to protect the second surface and the second electrode layer 211*c* of the vibration part 211.

The first cover member 213*a* and the second cover member 213*d* according to an embodiment of the present disclosure may include a same material or a different material. For example, each of the first cover member 213*a* and the second cover member 213*d* may be a polyimide film, a polyethylene terephthalate film, or a polyethylene naphthalate film, but embodiments of the present disclosure are not limited thereto.

The second cover member 213*d* may be connected or coupled to the second surface or the second electrode layer 211*c* of the vibration part 211 by a second adhesive layer 213*c*. For example, the second cover member 213*d* may be connected or coupled to the second surface or the second electrode layer 211*c* of the vibration part 211 by a film laminating process by using the second adhesive layer 213*c*.

The vibration part 211 may be disposed or inserted (or accommodated) between the first cover member 213*a* and the second cover member 213*d*. For example, the vibration part 211 may be inserted (or accommodated) or embedded (or built-in) at an inner portion of the adhesive layer including the first adhesive layer 213*b* and the second adhesive layer 213*c*.

Each of the first adhesive layer 213*b* and the second adhesive layer 213*c* according to an embodiment of the present disclosure may include an electrical insulating material which has adhesive properties and is capable of compression and decompression. For example, the first adhesive layer 213*b* and the second adhesive layer 213*c* may be configured as a same or different materials. For example, each of the first adhesive layer 213*b* and the second adhesive layer 213*c* may include a thermoplastic resin, a thermosetting resin, epoxy resin, acrylic resin, silicone resin, urethane resin, a pressure sensitive adhesive (PSA), an optically cleared adhesive (OCA), or an optically cleared resin (OCR), or the like, but embodiments of the present disclosure are not limited thereto.

The first adhesive layer 213*b* and the second adhesive layer 213*c* may be configured between the first cover member 213*a* and the second cover member 213*d* to surround the vibration part 211. For example, one or more of the first adhesive layer 213*b* and the second adhesive layer 213*c* may be configured to surround the vibration part 2111.

Any one of the first cover member 213*a* and the second cover member 213*d* may be connected or coupled to the vibration member 100 by the connection member 150 illustrated in FIG. 2 or 8.

The cover member 213 may include a middle portion MA and a periphery portion PA. The middle portion MA of the cover member 213 may cover the vibration part 211. The periphery portion PA of the cover member 213 may surround the middle portion MA. The middle portion MA of the cover member 213 may be between the periphery portion PA. The pad member 600 may be disposed at the middle portion MA except the periphery portion PA the cover member 213.

The pad member 600 according to an embodiment of the present disclosure may be connected to the cover member 213 to overlap the vibration part 211. For example, the pad member 600 may be connected to any one of the first cover member 213*a* and the second cover member 213*d* to overlap the vibration part 211. For example, the pad member 600 may be connected to any one of the second adhesive layer 213*c* and the second cover member 213*d* to overlap the vibration part 211. For example, the pad member 600 may be connected to the rear surface 200*b* of the second cover member 213*d* to overlap the vibration part 211. The pad member 600 described above with reference to FIGS. 11 and 12 may be changed to the pad member 700 described above with reference to FIG. 5 or may be changed to the pad member 800 described above with reference to FIG. 6, and thus, repeated descriptions may be omitted.

With reference to FIGS. 8, 11, and 12, each of the first vibration apparatus 201 and the second vibration apparatus 202 may include a cover member 213. The cover member 213 may be configured to cover at least one or more of the first and second surfaces of the vibration part 211 of each of the first vibration apparatus 201 and the second vibration apparatus 202. The pad member 600 may be connected to the cover member 213 to overlap the vibration part 211 of each of the first vibration apparatus 201 and the second vibration apparatus 202. For example, the pad member 600 may be connected to any one of the first cover member 213*a* and the second cover member 213*d* to overlap the vibration part 211 of each of the first vibration apparatus 201 and the second vibration apparatus 202.

The vibration apparatus 200 according to an embodiment of the present disclosure may further include a signal supply member 250.

The signal supply member 250 may be configured to supply a driving signal supplied from a driving circuit part to the vibration part 211. The signal supply member 250 may be configured to be electrically connected to the vibration part 211. The signal supply member 250 may be configured to be electrically connected to the first electrode layer 211*b* and the second electrode layer 211*c* of the vibration part 211.

A portion of the signal supply member 250 may be accommodated (or inserted) between the cover member 213 and the vibration part 211. For example, the portion of the signal supply member 250 may be accommodated (or inserted) between the first surface of the vibration part 211 and the first cover member 213*a*. For example, the portion of the signal supply member 250 may be accommodated (or inserted) between the first cover member 213*a* and the second cover member 213*d*.

According to an embodiment of the present disclosure, an end portion (or a distal end portion or one side or one portion) of the signal supply member 250 may be disposed or inserted (or accommodated) between one periphery portion of the cover member 213 and the vibration part 211. For example, the end portion (or a distal end portion or one side or one portion) of the signal supply member 250 may be disposed or inserted (or accommodated) between one periphery portion of the first cover member 213*a* and the first surface of the vibration part 211.

According to another embodiment of the present disclosure, the end portion (or a distal end portion or one side or one portion) of the signal supply member 250 may be disposed or inserted (or accommodated) between the one periphery portion of the first cover member 213*a* and one periphery portion of the second cover member 213*d*. The one periphery portion of the first cover member 213*a* and the one periphery portion of the second cover member 213*d* may accommodate or vertically (or up and down) cover the end portion (or the distal end portion or the one side or the one portion) of the signal supply member 250. Accordingly, the signal supply member 250 may be integrated as one body with the vibration apparatus 200. For example, the signal supply member 250 may be configured as a signal cable, a flexible cable, a flexible printed circuit cable, a flexible flat cable, a single-sided flexible printed circuit, a single-sided flexible printed circuit board, a flexible multilayer printed circuit, or a flexible multilayer printed circuit board, but embodiments of the present disclosure are not limited thereto.

The signal supply member 250 according to an embodiment of the present disclosure may include a base member 251 and a plurality of signal lines 252*a* and 252*b*. For example, the signal supply member 250 may include a base member 251, a first signal line 252*a*, and a second signal line 252*b*.

The base member 251 may include a transparent or opaque plastic material, but embodiments of the present disclosure are not limited thereto. The base member 251 may have a certain width along a first direction X and may be extended long along a second direction Y intersecting with the first direction X.

The first and second signal lines 252*a* and 252*b* may be disposed at a first surface of the base member 251 in parallel with the second direction Y and may be spaced apart from each other or electrically separated from each other along the first direction X. The first and second signal lines 252*a* and 252*b* may be disposed in parallel to each other at the first surface of the base member 251. For example, the first and second signal lines 252*a* and 252*b* may be implemented in a line shape by patterning of a metal layer (or a conductive layer) formed or deposited at the first surface of the base member 251.

End portions (or distal end portions or one sides or one portions) of the first and second signal lines 252*a* and 252*b* may be separated from each other, and thus, may be individually curved or bent.

The end portion (or the distal end portion or the one side or the one portion) of the first signal line 252*a* may be electrically connected to the first electrode layer 211*b* of the vibration part 211. For example, the end portion of the first signal line 252*a* may be electrically connected to at least a portion of the first electrode layer 211*b* of the vibration part 211 in the one periphery portion of the first cover member 213*a*. For example, the end portion (or the distal end portion or the one side or the one portion) of the first signal line 252*a* may be electrically and directly connected to at least a portion of the first electrode layer 211*b* of the vibration part 211. For example, the end portion (or the distal end portion or the one side or the one portion) of the first signal line 252*a* may be electrically connected to or directly contact the first electrode layer 211*b* of the vibration part 211. For example, the end portion of the first signal line 252*a* may be electrically connected to the first electrode layer 211*b* by a conductive double-sided tape. Accordingly, the first signal line 252*a* may be configured to supply a first driving signal, supplied from the driving circuit part, to the first electrode layer 211*b* of the vibration part 211.

The end portion (or the distal end portion or the one side or the one portion) of the second signal line 252*b* may be electrically connected to the second electrode layer 211*c* of the vibration part 211. For example, the end portion of the second signal line 252*b* may be electrically connected to at least a portion of the second electrode layer 211*c* of the vibration part 211 in the one periphery portion of the second cover member 213*d*. For example, the end portion of the second signal line 252*b* may be electrically and directly connected to at least a portion of the second electrode layer 211*c* of the vibration part 211. For example, the end portion of the second signal line 252*b* may be electrically connected to or directly contact the second electrode layer 211*c* of the vibration part 211. For example, the end portion of the second signal line 252*b* may be electrically connected to the second electrode layer 211*c* by a conductive double-sided tape. Accordingly, the second signal line 252*b* may be configured to supply a second driving signal, supplied from the driving circuit part, to the second electrode layer 211*c* of the vibration part 211.

The signal supply member 250 according to an embodiment of the present disclosure may further include an insulation layer 253.

The insulation layer 253 may be disposed at the first surface of the base member 251 to cover each of the first signal line 252*a* and the second signal line 252*b* other than the end portion (or one side or one portion) of the signal supply member 250.

According to an embodiment of the present disclosure, an end portion (or one side) of the signal supply member 250 including an end portion (or one side or one portion) of the base member 251 and an end portion (or one side or one portion) 253*a* of the insulation layer 253 may be inserted (or accommodated) between the cover member 213 and the vibration part 211 and may be fixed between the cover member 213 and the vibration part 211 by a first adhesive layer 213*b* and the second adhesive layer 213*c*.

According to an embodiment of the present disclosure, an end portion (or one side) of the signal supply member 250 including an end portion (or one side) of the base member 251 and an end portion (or one side or one portion) 253*a* of the insulation layer 253 may be inserted (or accommodated) between the first cover member 213*a* and the second cover member 213*d* and may be fixed between the first cover member 213*a* and the second cover member 213*d* by a first adhesive layer 213*b* and the second adhesive layer 213*c*. Accordingly, the end portion (or one side or one portion) of the first signal line 252*a* may be maintained with being electrically connected to the first electrode layer 211*b* of the vibration part 211, and the end portion (or one side or one portion) of the second signal line 252*b* may be maintained with being electrically connected to the second electrode layer 211*c* of the vibration part 211. In addition, the end portion (or one side or one portion) of the signal supply member 250 may be inserted (or accommodated) and fixed between the vibration part 211 and the first cover member 213*a*, and thus, a contact defect between the vibration apparatus 200 and the signal supply member 250 caused by the movement of the signal supply member 250 may be prevented.

In the signal supply member 250 according to an embodiment of the present disclosure, each of the end portion (or one side or one portion) of the base member 251 and the end portion (or one side or one portion) 253*a* of the insulation layer 253 may be removed. For example, each of the end portion of the first signal line 252*a* and the end portion of the second signal line 252*b* may be exposed at the outside without being supported or covered by each of the end portion (or one side or one portion) of the base member 251 and the end portion (or one side or one portion) 253*a* of the insulation layer 253, respectively. For example, the end portion (or one side or one portion) of each of the first signal line 252*a* and the second signal line 252*b* may protrude (or extend) to have a certain length from an end 251*e* of the base member 251 or an end 253*e* of the insulation layer 253. Accordingly, each of the end portion (or the distal end portion or the one side or the one portion) of each of the first signal line 252*a* and the second signal line 252*b* may be individually or independently bent.

The end portion (or one side or one portion) of the first signal line 252*a*, which is not supported by the end portion (or one side or one portion) of the base member 251 and the end portion (or one side) 253*a* of the insulation layer 253, may be directly connected to or directly contact the first electrode layer 211*b* of the vibration part 211. The end portion (or one side or one portion) of the second signal line 252*b*, which is not supported by the end portion (or one side or one portion) of the base member 251 and the end portion (or one side or one portion) 253*a* of the insulation layer 253, may be directly connected to or directly contact the second electrode layer 211*c* of the vibration part 211.

According to an embodiment of the present disclosure, a portion of the signal supply member 250 or a portion of the base member 251 may be disposed or inserted (or accommodated) between the cover member 213 and the vibration part 211, and thus, the signal supply member 250 may be integrated as one body with the vibration part 211. For example, a portion of the signal supply member 250 or a portion of the base member 251 may be disposed or inserted (or accommodated) between the first cover member 213*a* and the second cover member 213d, and thus, the signal supply member 250 may be integrated as one body with the vibration apparatus 200. Accordingly, the vibration apparatus 200 and the signal supply member 250 may be configured as one part (or one element or one component), and thus, an effect of uni-materialization may be obtained.

According to an embodiment of the present disclosure, the first signal line 252a and the second signal line 252b of the signal supply member 250 may be integrated as one body with the vibration apparatus 200, and thus, a soldering process for an electrical connection between the vibration apparatus 200 and the signal supply member 250 may not be needed. Accordingly, a manufacturing process and a structure of the vibration apparatus 200 may be simplified, and hazards associated with the soldering process may be reduced.

Figure 13:
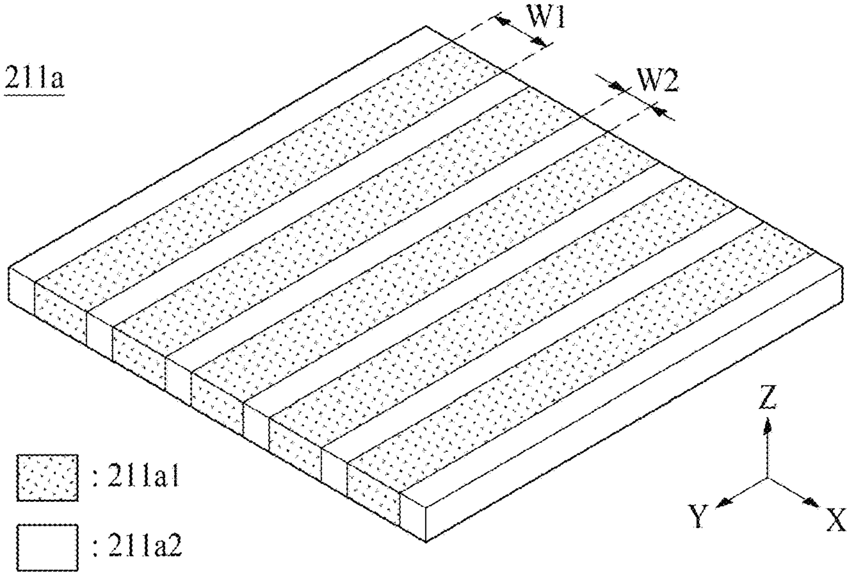
FIG. 13 illustrates a vibration layer according to another embodiment of the present disclosure.

FIG. 13 is a perspective view illustrating a vibration layer according to another embodiment of the present disclosure. FIG. 13 illustrates another embodiment of the vibration layer described above with reference to FIGS. 10 to 12. Therefore, in the following description, the other elements except the vibration layer are referred to like reference numerals, and repeated descriptions thereof may be omitted or will be briefly given below.

With reference to FIGS. 11 and 13, the vibration layer 211a according to another embodiment of the present disclosure may include a plurality of first portions 211a1 and a plurality of second portions 211a2. For example, the plurality of first portions 211a1 and the plurality of second portions 211a2 may be alternately and repeatedly disposed along a first direction X (or a second direction Y).

Each of the plurality of first portions 211a1 may include an inorganic material portion having a piezoelectric effect (or a piezoelectric characteristic). For example, each of the plurality of first portions 211a1 may include at least one or more of a piezoelectric inorganic material and a piezoelectric organic material. For example, each of the plurality of first portions 211a1 may be an inorganic portion, an inorganic material portion, a piezoelectric portion, a piezoelectric material portion, or an electroactive portion, but embodiments of the present disclosure are not limited thereto.

According to an embodiment of the present disclosure, each of the plurality of first portions 211a1 may have a first width W1 parallel to the first direction X (or the second direction Y) and may be extended along the second direction Y (or the first direction X). Each of the plurality of first portions 211a1 may be substantially a same as a vibration layer 211a described above with reference to FIGS. 10 to 12, and thus, repeated descriptions thereof may be omitted or will be briefly given below.

Each of the plurality of second portions 211a2 may be disposed between the plurality of first portions 211a1. For example, each of the plurality of first portions 211a1 may be disposed between two adjacent second portions 211a2 of the plurality of second portions 211a2. Each of the plurality of second portions 211a2 may have a second width W2 parallel to the first direction X (or the second direction Y) and may be extended along the second direction Y (or the first direction X). The first width W1 may be a same as or different from the second width W2. For example, the first width W1 may be greater than the second width W2. For example, the first portion 211a1 and the second portion 211a2 may include a line shape or a stripe shape which has a same size or different sizes.

Each of the plurality of second portions 211a2 may be configured to fill a gap between two adjacent first portions of the plurality of first portions 211a1. Each of the plurality of second portions 211a2 may be configured to fill a gap between two adjacent first portions of the plurality of first portions 211a1, and thus, may be connected to or attached at lateral surfaces of the first portion 211a1 adjacent thereto.

According to an embodiment of the present disclosure, each of the plurality of first portions 211a1 and the plurality of second portions 211a2 may be disposed (or arranged) at a same plane (or a same layer) in parallel with each other. Therefore, the vibration part 211a may be expanded to a desired size or length by a lateral coupling (or connection) of the first portions 211a1 and the second portions 211a2.

According to an embodiment of the present disclosure, each of the plurality of second portions 211a2 may absorb an impact applied to the first portions 211a1, and thus, may enhance the total durability of the first portions 211a1 and provide flexibility to the vibration part 211a. Each of the plurality of second portions 211a2 may include an organic material having a ductile characteristic. For example, each of the plurality of second portions 211a2 may include one or more of an epoxy-based polymer, an acrylic-based polymer, and a silicone-based polymer, but embodiments of the present disclosure are not limited thereto. For example, each of the plurality of second portions 211a2 may be an organic portion, an organic material portion, an adhesive portion, a stretch portion, a bending portion, a damping portion, or a ductile portion, but embodiments of the present disclosure are not limited thereto.

A first surface of each of the plurality of first portions 211a1 and the plurality of second portions 211a2 may be connected to the first electrode layer 211b in common. A second surface of each of the plurality of first portions 211a1 and the plurality of second portions 211a2 may be connected to the second electrode layer 211c in common. As another embodiment of the present disclosure, one or both of the first electrode layer 211b and the second electrode layer 211c may be formed as pattern-shaped electrodes to correspond only to the plurality of first portions 211a1.

The plurality of first portions 211a1 and the plurality of second portion 211a2 may be disposed (or connected) at a same plane, and thus, the vibration part 211a according to another embodiment of the present disclosure may have a single thin film-type. Accordingly, the vibration part 211 (or the vibration generating part 210, or the first vibration apparatus 201 and the second vibration apparatus 202, or the vibration apparatus 200) including the vibration layer 211a according to another embodiment of the present disclosure may vibrate by the first portion 211a1 having a vibration characteristic and may be bent in a curved shape by the second portion 211a2 having flexibility.

Figure 14:
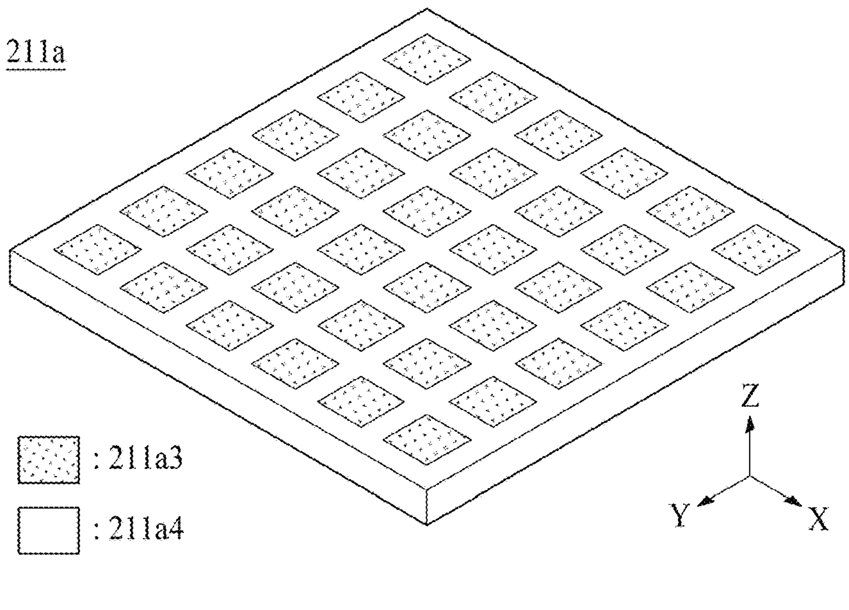
FIG. 14 illustrates a vibration layer according to another embodiment of the present disclosure.

FIG. 14 is a perspective view illustrating a vibration layer according to another embodiment of the present disclosure. FIG. 14 illustrates another embodiment of the vibration layer described above with reference to FIGS. 10 to 12.

With reference to FIGS. 11 and 14, the vibration layer 211a according to another embodiment of the present disclosure may include a plurality of first portions 211a3 and a second portion 211a4 disposed between the plurality of first portions 211a3.

Each of the plurality of first portions 211a3 may be disposed to be spaced apart from one another along each of the first direction X and the second direction Y. For example, each of the plurality of first portions 211a3 may have a hexahedral shape having a same size and may be disposed in a lattice shape, but embodiments of the present disclosure are not limited thereto. For example, each of the plurality of first portions 211a3 may have a circular shape plate, an oval shape plate, or a polygonal shape plate, which has a same size as each other, but embodiments of the present disclosure are not limited thereto.

Each of the plurality of first portions 211*a*3 may be substantially a same as the first portion 211*al* of the vibration layer 211*a* described above with reference to FIG. 13, and thus, repeated descriptions thereof may be omitted.

The second portion 211*a*4 may be disposed between the plurality of first portions 211*a*3 along each of the first direction X and the second direction Y. The second portion 211*a*4 may be configured to fill a gap between two adjacent first portions 211*a*3, or to be adjacent to each of the plurality of first portions 211*a*3 or to surround each of the plurality of first portions 211*a*3, and thus, the second portion 211*a*4 may be connected to or attached at the first portion 211*a*3 adjacent thereto. The second portion 211*a*4 may be substantially a same as the second portion 211*a*2 described above with reference to FIG. 13, and thus, repeated descriptions thereof may be omitted.

A first surface of each of the plurality of first portions 211*a*3 and the second portions 211*a*4 may be connected to the first electrode layer 1311*b* in common. A second surface of each of the plurality of first portions 211*a*3 and the second portions 211*a*4 may be connected to the second electrode layer 1311*c* in common.

The plurality of first portions 211*a*3 and the second portion 211*a*4 may be disposed (or connected) at a same plane, and thus, the vibration layer 211*a* according to another embodiment of the present disclosure may have a single thin film-type. Accordingly, the vibration part 211 (or the vibration generating part 210, or the first vibration apparatus 201 and the second vibration apparatus 202, or the vibration apparatus 200) including the vibration layer 211*a* according to another embodiment of the present disclosure may vibrate by the first portion 211*a*3 having a vibration characteristic and may be bent in a curved shape by the second portion 211*a*4 having flexibility.

Figure 15:
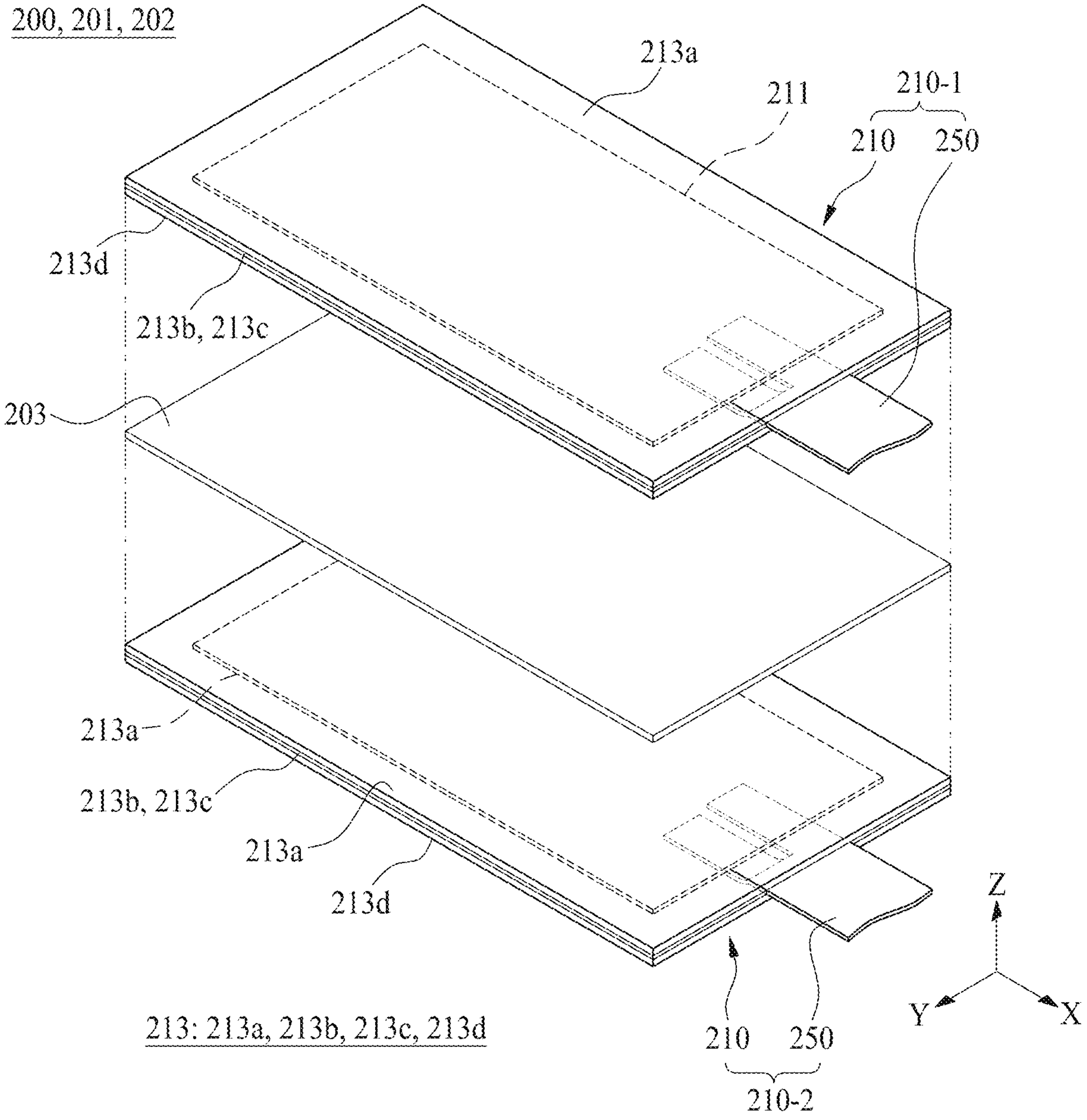
FIG. 15 illustrates a vibration apparatus according to another embodiment of the present disclosure.

FIG. 15 illustrates a vibration apparatus according to another embodiment of the present disclosure. FIG. 15 illustrates a vibration apparatus described above with reference to FIGS. 1 to 9.

With reference to FIGS. 2, 8, and 15, the vibration apparatus 200 according to another embodiment of the present disclosure may include two or more vibration generating parts 210-1 and 210-2. For example, the vibration apparatus 200 may include a first vibration generating part 210-1 and a second vibration generating part 210-2.

The first vibration generating part 210-1 and the second vibration generating part 210-2 may overlap or be stacked with each other to be displaced (or driven or vibrated) in a same direction to maximize an amplitude displacement of the vibration apparatus 200 or an amplitude displacement of a vibration member. For example, the second vibration generating part 210-2 may be stacked on the first vibration generating part 210-1. For example, the first vibration generating part 210-1 and the second vibration generating part 210-2 may have substantially a same size, but embodiments of the present disclosure are not limited thereto. For example, the first vibration generating part 210-1 and the second vibration generating part 210-2 may have substantially a same size within an error range of a manufacturing process, but embodiments of the present disclosure are not limited thereto. Therefore, the first vibration generating part 210-1 and the second vibration generating part 210-2 may maximize the amplitude displacement of the vibration apparatus 200 and/or the amplitude displacement of the vibration member.

According to an embodiment of the present disclosure, any one of the first vibration generating part 210-1 and the second vibration generating part 210-2 may be connected or coupled to the vibration member 100 by the connection member 150 illustrated in FIGS. 2 to 8. For example, the first vibration generating part 210-1 may be connected or coupled to the vibration member 100 by the connection member 150.

Each of the first vibration generating part 210-1 and the second vibration generating part 210-2 may be a same as or substantially a same as the vibration apparatus 200 or the vibration part 211 described above with reference to FIGS. 10 to 12, and thus, like reference numeral refer to like element and repeated descriptions thereof may be omitted. For example, each of the first vibration generating part 210-1 and the second vibration generating part 210-2 may include the vibration part 211 and the cover member 213.

The vibration apparatus 200 according to another embodiment of the present disclosure may further include an intermediate member 203.

The intermediate member 203 may be disposed or connected between the first vibration generating part 210-1 and the second vibration generating part 210-2. As an embodiment of the present disclosure, the intermediate member 203 may be disposed or connected between the second adhesive layer 213*c* of the first vibration generating part 210-1 and the first cover member 213*a* of the second vibration generating part 210-2. As another embodiment of the present disclosure, the intermediate member 203 may be disposed or connected between the second cover member 213*d* of the first vibration generating part 210-1 and the first cover member 213*a* of the second vibration generating part 210-2. For example, the intermediate member 203 may be an intermediate adhesive member, adhesive member, or a connection member, but embodiments of the present disclosure are not limited thereto.

The intermediate adhesive member 203 according to an embodiment of the present disclosure may be configured in a material including an adhesive layer which is good in adhesive force or attaching force with respect to each of the first vibration generating part 210-1 and the second vibration generating part 210-2. For example, the intermediate adhesive member 203 may include a foam pad, a double-sided tape, a double-sided foam tape, a double-sided foam pad, a double-sided adhesive tape, or an adhesive, or the like, but embodiments of the present disclosure are not limited thereto. For example, an adhesive layer of the intermediate adhesive member 203 may include epoxy, acrylic, silicone, or urethane, but embodiments of the present disclosure are not limited thereto. For example, the adhesive layer of the intermediate adhesive member 203 may include a urethane-based material (or substance) having relatively ductile characteristic. Accordingly, the vibration loss caused by displacement interference between the first vibration generating part 210-1 and the second vibration generating part 210-2 may be reduced or minimized, or each of the first vibration generating part 210-1 and the second vibration generating part 210-2 may be freely displaced (or vibrated or driven).

The vibration apparatus 200 according to another embodiment of the present disclosure may include the first vibration generating part 210-1 and the second vibration generating part 210-2 which are stacked (or piled or overlap) to vibrate (or displace or drive) in a same direction, and thus, the amount of displacement or an amplitude displacement may be maximized or increase. Accordingly, the amount of displacement (or a bending force or a driving force) or an amplitude of displacement of the vibration member 100 may be more maximized or more increased, thereby further enhancing a sound characteristic and/or a sound pressure level characteristic of a low-pitched sound band.

Figure 16:
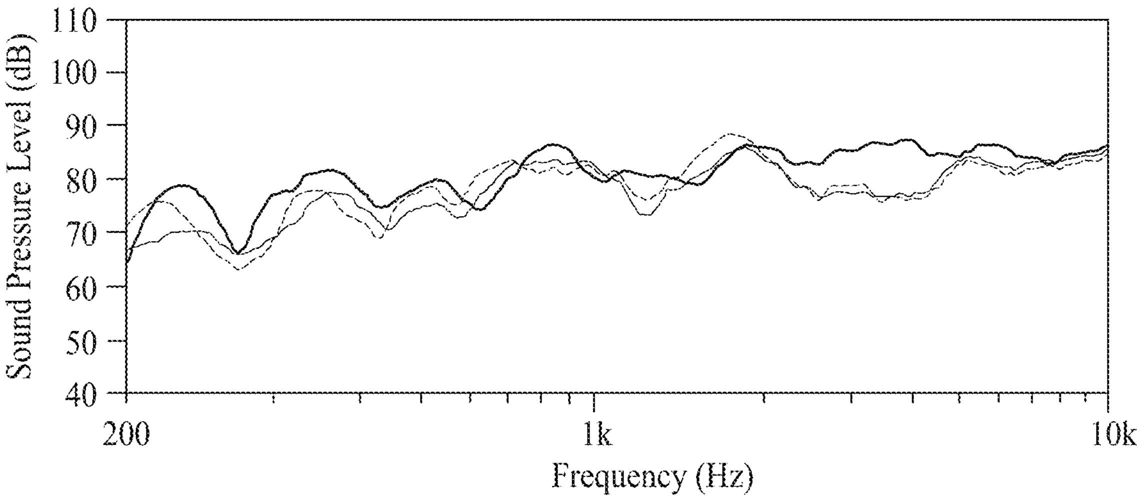
FIG. 16 illustrates a sound output characteristic of each of an apparatus according to an embodiment of the present disclosure and an apparatus according to experimental examples.

FIG. 16 illustrates a sound output characteristic of each of an apparatus according to an embodiment of the present disclosure and an apparatus according to an experimental example.

A sound output characteristic may be measured by a sound measurement apparatus in an anechoic chamber which is closed in all directions. The sound analysis apparatus may be configured to include a sound card that may transmit or receive sound to or from a control personal computer (PC), an amplifier that may amplify a signal generated from the sound card and transfer the amplified signal to a vibration apparatus, and a microphone that may collect sound generated by a display panel based on driving of the vibration apparatus. For example, the microphone is disposed at a distance of 50 cm from a front surface of the vibration apparatus on the display panel. The sound collected through the microphone may be input to the control PC through the sound card, and a control program may check the input sound to analyze the sound output characteristic of the vibration apparatus. For example, a frequency response characteristic of a frequency range of 100 Hz to 20 kHz may be measured by a pulse program. The measurement method of the sound output characteristic does not limit the content of the present disclosure.

A dotted line and a thin solid line of FIG. 16 represent a sound output characteristic of the apparatus according to the experimental example. The dotted line represents a sound output characteristic of when a pad member is not configured in a vibration apparatus. The thin solid line represents a sound output characteristic of when one pad member is configured at a center portion of a vibration apparatus. A thick solid line of FIG. 16 represents a sound output characteristic of the apparatus of FIGS. 3 and 4 according to an embodiment of the present disclosure. In FIG. 16, the abscissa axis represents a frequency in hertz (Hz), and the ordinate axis represents a sound pressure level (SPL) in decibels (dB).

With reference to FIG. 16, comparing with the apparatus (the dotted line), including no pad member, of the experimental example, it may be seen that the apparatus (the thick solid line) according to an embodiment of the present disclosure has a high sound pressure level in a middle-high-pitched sound band (for example, about 800 Hz to 1 kHz and/or 2 kHz to 6 kHz). Comparing with the apparatus (the thin solid line), where one pad member is provided at the center portion of the vibration apparatus, of the experimental example, it may be seen that the apparatus (the thick solid line) according to an embodiment of the present disclosure has a high sound pressure level in the middle-high-pitched sound band (for example, about 800 Hz to 1 kHz and/or 2 kHz to 6 kHz). Therefore, in the apparatus according to an embodiment of the present disclosure, a pad member having a line shape may be provided at a rear surface of a vibration member, and thus, comparing with the apparatus according to the experimental example, it may be seen that a sound output characteristic and a sound pressure level characteristic are improved in the middle-high-pitched sound band (for example, about 800 Hz to 1 kHz and/or 2 kHz to 6 kHz). In addition, in the apparatus according to an embodiment of the present disclosure, the pad member having a line shape may be provided at the rear surface of the vibration member, and thus, comparing with the apparatus according to the experimental example, it may be seen that a peak and/or dip are/is improved in 1 kHz to 10 kHz, and a flatness characteristic of a sound pressure level is enhanced. Peak may be a phenomenon where a sound pressure level bounces in a specific frequency, and dip may be a phenomenon where a low sound pressure level is generated as the occurrence of a sound having a specific frequency is reduced. The flatness of the sound pressure level may be the magnitude of the deviation between the highest sound pressure level and the lowest sound pressure level.

Figure 17:
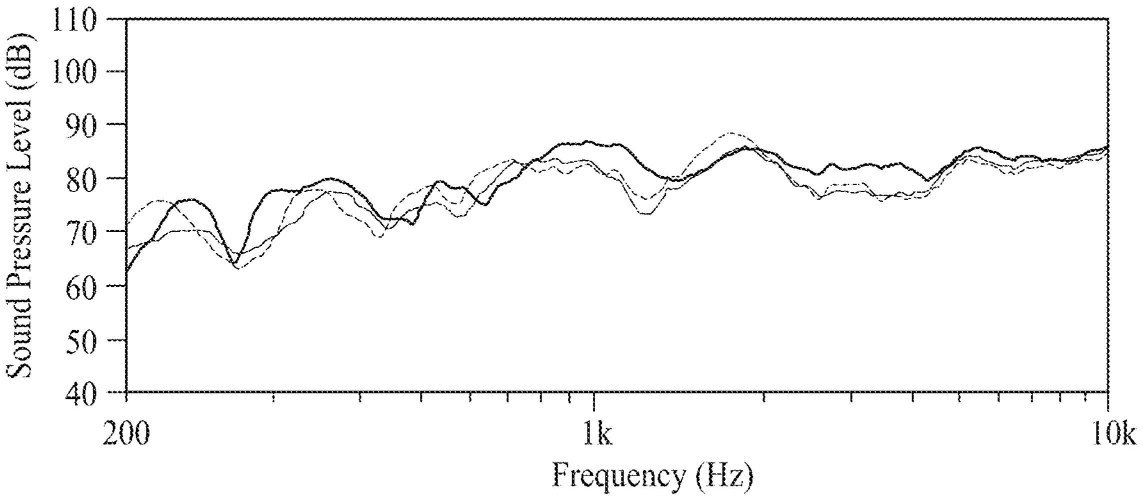
FIG. 17 illustrates a sound output characteristic of each of an apparatus according to an embodiment of the present disclosure and an apparatus according to experimental examples.

FIG. 17 illustrates a sound output characteristic of each of an apparatus according to an embodiment of the present disclosure and an apparatus according to an experimental example.

A measurement method of a sound output characteristic may be a same as described above with reference to FIG. 16, and thus, repeated descriptions are omitted.

A dotted line and a thin solid line of FIG. 17 represent a sound output characteristic of the apparatus according to the experimental example. The dotted line represents a sound output characteristic of when a pad member is not configured in a vibration apparatus. The thin solid line represents a sound output characteristic of when one pad member is configured at a center portion of a vibration apparatus. A thick solid line of FIG. 17 represents a sound output characteristic of the apparatus of FIG. 5 according to an embodiment of the present disclosure. In FIG. 17, the abscissa axis represents a frequency in hertz (Hz), and the ordinate axis represents a sound pressure level (SPL) in decibels (dB).

With reference to FIG. 17, comparing with the apparatus (the dotted line), including no pad member, of the experimental example, it may be seen that the apparatus (the thick solid line) according to an embodiment of the present disclosure has a high sound pressure level in a middle-high-pitched sound band (for example, about 800 Hz to 1 kHz and/or 2 kHz to 6 kHz). Comparing with the apparatus (the thin solid line), where one pad member is provided at the center portion of the vibration apparatus, of the experimental example, it may be seen that the apparatus (the thick solid line) according to an embodiment of the present disclosure has a high sound pressure level in the middle-high-pitched sound band (for example, about 800 Hz to 1 kHz and/or 2 kHz to 6 kHz). Therefore, in the apparatus according to an embodiment of the present disclosure, a pad member having an inclined line shape may be provided at a rear surface of a vibration member, and thus, comparing with the apparatus according to the experimental example, it may be seen that a sound output characteristic and a sound pressure level characteristic are improved in the middle-high-pitched sound band (for example, about 800 Hz to 1 kHz and/or 2 kHz to 6 kHz). In addition, in the apparatus according to an embodiment of the present disclosure, the pad member having an inclined line shape may be provided at the rear surface of the vibration member, and thus, comparing with the apparatus according to the experimental example, it may be seen that a peak and/or dip are/is improved in 1 kHz to 10 kHz, and a flatness characteristic of a sound pressure level is enhanced.

Figure 18:
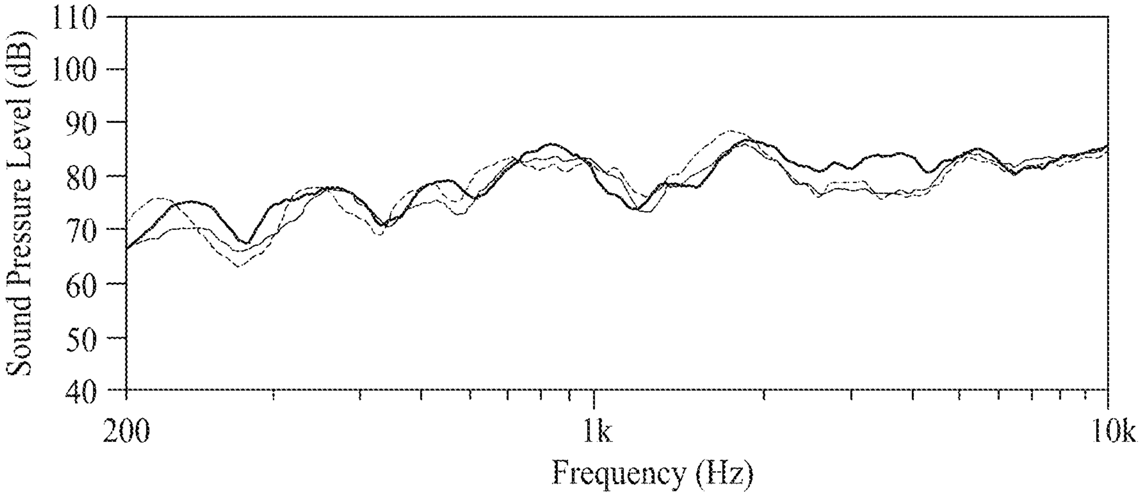
FIG. 18 illustrates a sound output characteristic of each of an apparatus according to an embodiment of the present disclosure and an apparatus according to experimental examples.

FIG. 18 illustrates a sound output characteristic of each of an apparatus according to an embodiment of the present disclosure and an apparatus according to an experimental example.

A measurement method of a sound output characteristic may be a same as described above with reference to FIG. 16, and thus, repeated descriptions are omitted.

A dotted line and a thin solid line of FIG. 18 represent a sound output characteristic of the apparatus according to the experimental example. The dotted line represents a sound output characteristic of when a pad member is not configured in a vibration apparatus. The thin solid line represents a sound output characteristic of when one pad member is configured at a center portion of a vibration apparatus. A thick solid line of FIG. 18 represents a sound output characteristic of the apparatus of FIG. 6 according to an embodiment of the present disclosure. In FIG. 18, the abscissa axis represents a frequency in hertz (Hz), and the ordinate axis represents a sound pressure level (SPL) in decibels (dB).

With reference to FIG. 18, comparing with the apparatus (the dotted line), including no pad member, of the experimental example, it may be seen that the apparatus (the thick solid line) according to an embodiment of the present disclosure has a high sound pressure level in a middle-high-pitched sound band (for example, about 800 Hz to 1 kHz and/or 2 kHz to 6 kHz). Comparing with the apparatus (the thin solid line), where one pad member is provided at the center portion of the vibration apparatus, of the experimental example, it may be seen that the apparatus (the thick solid line) according to an embodiment of the present disclosure has a high sound pressure level in the middle-high-pitched sound band (for example, about 800 Hz to 1 kHz and/or 2 kHz to 6 kHz). Therefore, in the apparatus according to an embodiment of the present disclosure, a pad member having an 'M'-shape and an 'W'-shape may be provided at a rear surface of a vibration member, and thus, comparing with the apparatus according to the experimental example, it may be seen that a sound output characteristic and a sound pressure level characteristic are improved in the middle-high-pitched sound band (for example, about 800 Hz to 1 kHz and/or 2 kHz to 6 kHz). In addition, in the apparatus according to an embodiment of the present disclosure, the pad member having an 'M'-shape and an 'W'-shape may be provided at the rear surface of the vibration member, and thus, comparing with the apparatus according to the experimental example, it may be seen that a peak and/or dip are/is improved in 1 kHz to 10 kHz, and a flatness characteristic of a sound pressure level is enhanced.

An apparatus according to one or more embodiments of the present disclosure may comprise a vibration member, a vibration apparatus configured to vibrate the vibration member, the vibration apparatus including a long side and a short side, and a pad member connected to a rear surface of the vibration apparatus. The pad member may comprise a line shape which is parallel to a long-side length direction of the vibration apparatus, or is inclined from the long-side length direction of the vibration apparatus.

According to one or more embodiments of the present disclosure, the vibration apparatus may comprise a middle portion and a periphery portion surrounding the middle portion. The pad member may be configured at the middle portion except the periphery portion of the vibration apparatus.

According to one or more embodiments of the present disclosure, the vibration apparatus may comprise a first region and a second region parallel to the long-side length direction. The pad member may be configured at each of the first region and the second region of the vibration apparatus.

According to one or more embodiments of the present disclosure, the pad member may comprise a first pad member configured at the first region of the vibration apparatus, and a second pad member configured at the second region of the vibration apparatus. Each of the first pad member and the second pad member may have a line shape extending along the long-side length direction of the vibration apparatus.

According to one or more embodiments of the present disclosure, each of the first pad member and the second pad member may be spaced apart from a center line parallel to the long-side length direction of the vibration apparatus.

According to one or more embodiments of the present disclosure, each of the first pad member and the second pad member may be configured closer to a center portion of the vibration apparatus than the long side of the vibration apparatus.

According to one or more embodiments of the present disclosure, the first pad member and the second pad member may be configured to be symmetric with respect to a center portion of the vibration apparatus.

According to one or more embodiments of the present disclosure, the pad member may comprise a pair of first pad members configured at the first region of the vibration apparatus, and a pair of second pad members configured at the second region of the vibration apparatus.

According to one or more embodiments of the present disclosure, each of the pair of first pad members and the pair of second pad members may comprise a line shape extending along a diagonal direction between the long-side length direction and a short-side length direction of the vibration apparatus.

According to one or more embodiments of the present disclosure, one end of each of the pair of first pad members and the pair of second pad members may be spaced apart from a center portion of the vibration apparatus.

According to one or more embodiments of the present disclosure, the pair of first pad members may be configured to be symmetric with respect to the center portion of the vibration apparatus. The pair of second pad members may be configured to be symmetric with respect to the center portion of the vibration apparatus.

According to one or more embodiments of the present disclosure, the pair of first pad members and the pair of second pad members may be configured to be symmetric with respect to the center portion of the vibration apparatus.

According to one or more embodiments of the present disclosure, the pad member may comprise a plurality of first pad members configured at the first region of the vibration apparatus, and a plurality of second pad members configured at the second region of the vibration apparatus.

According to one or more embodiments of the present disclosure, each of the plurality of first pad members and the plurality of second pad members may comprise a line shape extending along a diagonal direction between the long-side length direction and a short-side length direction of the vibration apparatus.

According to one or more embodiments of the present disclosure, the plurality of first pad members may be disposed in an 'M'-shape at the first region of the vibration apparatus. The plurality of second pad members may be disposed in an 'W'-shape at the second region of the vibration apparatus.

According to one or more embodiments of the present disclosure, the plurality of first pad members may be configured to be symmetric with respect to a center portion of the vibration apparatus. The plurality of second pad members may be configured to be symmetric with respect to the center portion of the vibration apparatus.

According to one or more embodiments of the present disclosure, the plurality of first pad members and the plurality of second pad members may be configured to be symmetric with respect to a center portion of the vibration apparatus.

According to one or more embodiments of the present disclosure, the vibration member may comprise a long side and a short side. The long side of the vibration apparatus may be parallel to the long side of the vibration member.

According to one or more embodiments of the present disclosure, the vibration apparatus may comprise a vibration part including a piezoelectric material, and a cover member covering at least one or more of a first surface of the vibration part and a second surface opposite to the first surface of the vibration part. The pad member may be connected to the cover member to overlap the vibration part.

According to one or more embodiments of the present disclosure, the cover member may comprise a middle portion covering the vibration part and a periphery portion surrounding the middle portion. The pad member may be configured at the middle portion except the periphery portion of the cover member.

According to one or more embodiments of the present disclosure, the cover member may comprise a first cover member covering the first surface of the vibration part, and a second cover member covering the second surface of the vibration part. The pad member may be connected to any one of the first cover member and the second cover member to overlap the vibration part.

According to one or more embodiments of the present disclosure, the vibration apparatus may further comprise a signal supply member electrically connected to the vibration part. A portion of the signal supply member may be accommodated between the cover member and the vibration part.

According to one or more embodiments of the present disclosure, the vibration apparatus may comprise a first vibration generating part, a second vibration generating part stacked on the first vibration generating part, and an intermediate member between the first vibration generating part and the second vibration generating part. Each of the first vibration generating part and the second vibration generating part may comprise the vibration member and the cover member.

According to one or more embodiments of the present disclosure, the vibration member may comprise a first region and a second region. The vibration apparatus may comprise a first vibration apparatus configured at the first region of the vibration member, and a second vibration apparatus configured at the second region of the vibration member. The pad member may be connected to a rear surface of each of the first vibration apparatus and the second vibration apparatus.

According to one or more embodiments of the present disclosure, the vibration member may comprise a long side and a short side. The long side of each of the first vibration apparatus and the second vibration apparatus may be parallel to the long side of the vibration member.

According to one or more embodiments of the present disclosure, each of the first vibration apparatus and the second vibration apparatus may comprise a vibration part including a piezoelectric material, and a cover member covering at least one or more of a first surface of the vibration part and a second surface opposite to the first surface of the vibration part. The pad member may be connected to the cover member to overlap the vibration part.

According to one or more embodiments of the present disclosure, the vibration member may comprise a display panel having a pixel configured to display an image.

According to one or more embodiments of the present disclosure, the vibration member may comprise one or more material of metal, plastic, fiber, leather, wood, cloth, rubber, carbon, glass, and paper.

According to one or more embodiments of the present disclosure, the apparatus may further comprise a supporting member at a rear surface of the vibration member and the vibration apparatus. The pad member may be spaced apart from the supporting member.

According to one or more embodiments of the present disclosure, the pad member may be configured as one of a double-sided adhesive, a silicone-based polymer, paraffin wax, and an acrylic-based polymer.

A vibration apparatus according to one or more embodiments of the present disclosure may be applied to or included in a vibration apparatus disposed at an apparatus or a display apparatus. An apparatus or a display apparatus according to one or more embodiments of the present disclosure may be applied to or included in mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic books, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theatre apparatuses, theatre display apparatuses, TVs, wall paper display apparatuses, signage apparatuses, game machines, notebook computers, monitors, cameras, camcorders, and home appliances, or the like. In addition, the vibration apparatus according to one or more embodiments of the present disclosure may be applied to or included in an organic light-emitting lighting apparatus or an inorganic light-emitting lighting apparatus. When the vibration apparatus is applied to the lighting apparatuses, the lighting apparatuses may act as lighting and a speaker. Moreover, when the vibration apparatus according to one or more embodiments of the present disclosure is applied to or included in the mobile apparatuses, or the like, the vibration apparatus may be one or more of a speaker, a receiver, and a haptic device, but embodiments of the present disclosure are not limited thereto.

It will be apparent to those skilled in the art that various modifications and variations may be made in the present disclosure without departing from the scope of the disclosures. Thus, it is intended that the present disclosure covers the modifications and variations of this disclosure that come within the scope of the claims and their equivalents.

What is claimed is:

1. An apparatus, comprising:

a vibration member;

a vibration apparatus at a rear surface of the vibration member and configured to vibrate the vibration member, the vibration apparatus including a long side and a short side shorter than the long side; and a pad member connected to a rear surface of the vibration apparatus facing away from the vibration member, the vibration apparatus being disposed between the vibration member and the pad member, wherein each of the long side and the short side of the vibration apparatus is a continuous side, wherein a long side of the pad member is parallel to a diagonal direction between a long-side length direction and a short-side length direction of the vibration apparatus, and wherein the pad member comprises a line shape extending from a side of the vibration apparatus toward a center line of the short side of the vibration apparatus along the diagonal direction, the center line of the short side of the vibration apparatus being parallel to the long side of the vibration apparatus.

2. The apparatus of claim 1, wherein the vibration apparatus further comprises a middle portion and a periphery portion surrounding the middle portion at all sides, the middle portion being spaced apart from the long side and the short side of the vibration apparatus, and wherein the pad member is disposed at the middle portion without being disposed at the periphery portion of the vibration apparatus, the pad member being spaced apart from the long side and the short side of the vibration apparatus.

3. The apparatus of claim 2, wherein the vibration apparatus further comprises a first region and a second region parallel to the long-side length direction, and wherein the pad member is configured at each of the first region and the second region of the vibration apparatus.

4. The apparatus of claim 3, wherein the pad member comprises:

a pair of first pad members configured at the first region of the vibration apparatus; and a pair of second pad members configured at the second region of the vibration apparatus.

5. The apparatus of claim 4, wherein each of the pair of first pad members and the pair of second pad members comprises the line shape extending along the diagonal direction.

6. The apparatus of claim 5, wherein one end of each of the pair of first pad members and the pair of second pad members is spaced apart from a center portion of the vibration apparatus.

7. The apparatus of claim 5, wherein the pair of first pad members are configured to be symmetric with respect to a center portion of the vibration apparatus, and wherein the pair of second pad members are configured to be symmetric with respect to the center portion of the vibration apparatus.

8. The apparatus of claim 5, wherein the pair of first pad members and the pair of second pad members are configured to be symmetric with respect to a center portion of the vibration apparatus.

9. The apparatus of claim 3, wherein the pad member comprises:

a plurality of first pad members configured at the first region of the vibration apparatus; and a plurality of second pad members configured at the second region of the vibration apparatus.

10. The apparatus of claim 9, wherein each of the plurality of first pad members and the plurality of second pad members comprises the line shape extending along the diagonal direction.

11. The apparatus of claim 10, wherein the plurality of first pad members are disposed in an 'M'-shape at the first region of the vibration apparatus, and wherein the plurality of second pad members are disposed in an 'W'-shape at the second region of the vibration apparatus.

12. The apparatus of claim 11, wherein the plurality of first pad members are configured to be symmetric with respect to a center portion of the vibration apparatus, and wherein the plurality of second pad members are configured to be symmetric with respect to the center portion of the vibration apparatus.

13. The apparatus of claim 11, wherein the plurality of first pad members and the plurality of second pad members are configured to be symmetric with respect to a center portion of the vibration apparatus.

14. The apparatus of claim 1, wherein the vibration member comprises a long side and a short side, and wherein the long side of the vibration apparatus is parallel to the long side of the vibration member.

15. The apparatus of claim 1, wherein the vibration apparatus comprises:

a vibration part including a piezoelectric material; and a cover member covering at least one or more of a first surface of the vibration part and a second surface opposite to the first surface of the vibration part, and wherein the pad member is connected to the cover member to overlap the vibration part.

16. The apparatus of claim 15, wherein the cover member comprises a middle portion covering the vibration part and a periphery portion surrounding the middle portion at all sides, and wherein the pad member is disposed at the middle portion of the cover member without being disposed at the periphery portion of the cover member.

17. The apparatus of claim 15, wherein the cover member comprises:

a first cover member covering the first surface of the vibration part; and a second cover member covering the second surface of the vibration part, and wherein the pad member is connected to one of the first cover member and the second cover member to overlap the vibration part.

18. The apparatus of claim 15, wherein the vibration apparatus further comprise a signal supply member electrically connected to the vibration part, and wherein a portion of the signal supply member is accommodated between the cover member and the vibration part.

19. The apparatus of claim 15, wherein the vibration apparatus comprises:

a first vibration generating part;

a second vibration generating part stacked on the first vibration generating part; and an intermediate member between the first vibration generating part and the second vibration generating part, and wherein each of the first vibration generating part and the second vibration generating part comprises the vibration member and the cover member.

20. The apparatus of claim 1, further comprising:

another vibration apparatus spaced apart from the vibration apparatus; and another pad member connected to the other vibration apparatus and spaced apart from the pad member, wherein the vibration member comprises a first region and a second region, and wherein the vibration apparatus is disposed at the first region of the vibration member, and the other vibration apparatus is disposed at the second region of the vibration member.

21. The apparatus of claim 20, wherein the vibration member comprises a long side and a short side, and wherein each of the long side of the vibration apparatus and a long side of the other vibration apparatus is parallel to the long side of the vibration member.

22. The apparatus of claim 20, wherein each of the vibration apparatus and the other vibration apparatus comprises:

a vibration part including a piezoelectric material; and a cover member covering at least one or more of a first surface of the vibration part and a second surface opposite to the first surface of the vibration part, and wherein the pad member is connected to the cover member to overlap the vibration part.

23. The apparatus of claim 1, wherein the vibration member comprises a display panel having a pixel configured to display an image.

24. The apparatus of claim 1, wherein the vibration member comprises one or more material of metal, plastic, fiber, leather, wood, cloth, rubber, carbon, glass, and paper.

25. The apparatus of claim 1, further comprising a supporting member at a rear surface of the vibration member and the vibration apparatus, wherein the pad member is spaced apart from the supporting member.

26. The apparatus of claim 1, wherein the pad member is configured as one of a double-sided adhesive, a silicone-based polymer, paraffin wax, and an acrylic-based polymer.

* * * * *